(12) United States Patent
Iriarte Lopez

(10) Patent No.: US 11,686,192 B1
(45) Date of Patent: Jun. 27, 2023

(54) METHODS AND SYSTEMS FOR PROCESSING TIME-SERIES WELL DATA TO IDENTIFY EVENTS, CORRELATE EVENTS, AND ALTER OPERATIONS BASED THEREON

(71) Applicant: Well Data Labs, Inc., Denver, CO (US)

(72) Inventor: Jessica G. Iriarte Lopez, Denver, CO (US)

(73) Assignee: Well Data Labs, Inc., Denver, CO (US)

(*) Notice: Subject to any disclaimer, the term of this patent is extended or adjusted under 35 U.S.C. 154(b) by 0 days.

(21) Appl. No.: 17/308,861

(22) Filed: May 5, 2021

Related U.S. Application Data

(63) Continuation-in-part of application No. 16/951,946, filed on Nov. 18, 2020, and a continuation-in-part of application No. 16/931,288, filed on Jul. 16, 2020, said application No. 16/951,946 is a continuation-in-part of application No. 16/850,972, filed on Apr. 16, 2020, now Pat. No. 11,555,399, application No. 17/308,861 is a continuation-in-part of application No. 16/850,972, filed on Apr. 16, 2020, now Pat. No. 11,555,399.

(60) Provisional application No. 63/020,360, filed on May 5, 2020, provisional application No. 62/953,020, filed on Dec. 23, 2019, provisional application No. 62/937,068, filed on Nov. 18, 2019, provisional application No. 62/874,864, filed on Jul. 16, 2019, provisional application No. 62/874,951, filed on Jul. 16, 2019, provisional application No. 62/834,841, filed on Apr. 16, 2019.

(51) Int. Cl.
*E21B 47/06* (2012.01)
*G06F 17/15* (2006.01)
*E21B 43/267* (2006.01)
*E21B 47/13* (2012.01)

(52) U.S. Cl.
CPC ............ *E21B 47/06* (2013.01); *E21B 43/267* (2013.01); *E21B 47/13* (2020.05); *G06F 17/15* (2013.01)

(58) Field of Classification Search
CPC .......... E21B 43/26; E21B 49/00; E21B 47/06; E21B 43/267; E21B 47/10; E21B 44/00; E21B 21/08; E21B 2200/20; E21B 47/12
See application file for complete search history.

(56) References Cited

U.S. PATENT DOCUMENTS

| | | | |
|---|---|---|---|
| 10,982,535 B2 * | 4/2021 | Wang | E21B 49/00 |
| 11,299,980 B2 * | 4/2022 | Felkl | G01V 1/48 |

* cited by examiner

*Primary Examiner* — Zakiya W Bates
(74) *Attorney, Agent, or Firm* — Polsinelli PC; Gregory P. Durbin

(57) ABSTRACT

Certain aspects are directed towards systems and techniques for identifying fracture driven interactions. One example method generally includes: accessing well data comprising a series of well data parameters of a first well corresponding to a time when the first well is being hydraulically fractured; accessing well data comprising a series of pressure values for a second well offset from the first well, the series of pressure values corresponding to the time when the first well is being hydraulically fractured; identifying a time for an event from the series of well data parameters; identifying an offset pressure increase in the series of pressure values for the second well; and generating an indication of fracture driven interaction when the offset pressure increase is within a threshold of the event.

7 Claims, 20 Drawing Sheets

ACCESS WELL TREATMENT DATA CHANNELS (E.G., TIME SERIES DATA FOR TREATING PRESSURE, SLURRY RATE, BOTTOM HOLE PROPPANT CONCENTRATION) FOR A WELL BORE
200

GENERATE ONE OR MORE HIGHER ORDER CHANNELS FROM THE WELL TREATMENT (E.G., RATE OF CHANGE OF TREATING PRESSURE, RATE OF CHANGE OF SLURRY RATE)
202

SCALE AND COMBINE CHANNELS TO DEFINE COMBINED CHANNEL OR CHANNELS
204

FILTER THE TREATMENT DATA AND/OR HIGHER ORDER CHANNELS AND/OR COMBINED CHANNELS TO ISOLATE WINDOWS OF DATA MOST LIKELY TO CONTAIN FEATURE OF INTEREST
206

IDENTIFY FEATURE OF INTEREST IN FILTERED DATA CHANNELS
208

UPDATE DATA AND DISPLAY OF THE SAME TO INCLUDE FEATURE OF INTEREST, PROVIDED INSTRUCTIONS TO EQUIPMENT FOR MODIFYING PARAMETERS BASED ON IDENTIFIED FEATURE OF INTEREST
210

FIG. 2

METHODS AND SYSTEMS FOR PROCESSING TIME-SERIES WELL DATA TO IDENTIFY EVENTS, CORRELATE EVENTS, AND ALTER OPERATIONS BASED THEREON

CROSS-REFERENCE TO RELATED APPLICATION

This application is related to and claims priority under 35 U.S.C. § 119(e) from U.S. Patent Application No. 63/020,360 filed May 5, 2020 entitled "METHODS AND SYSTEMS FOR PROCESSING TIME-SERIES DATA USING HIGHER ORDER CHANNELS TO IDENTIFY EVENTS ASSOCIATED WITH DRILLING, COMPLETION AND/ OR FRACTURING OPERATIONS AND ALTER DRILLING, COMPLETION AND/OR FRACTURING OPERATIONS BASED THEREON," the entire contents of which is incorporated herein by reference for all purposes. This application is a continuation-in-part of co-pending application Ser. No. 16/850,972 titled "Breakdown Pressure Flag Automation," filed on Apr. 16, 2020, which is hereby incorporated by reference herein. This application is also a continuation-in-part of co-pending application Ser. No. 16/931,288 titled "Offline and Real-Time Start and End Times Detection," filed on Jul. 16, 2020, which is hereby incorporated by reference herein. This application is also a continuation-in-part of co-pending application Ser. No. 16/951,946 titled "Methods and Systems for Processing Time-Series Data Using Higher Order Channels," filed on Nov. 18, 2020, which is hereby incorporated by reference herein.

TECHNICAL FIELD

Aspects of the present disclosure involve analysis of time sequenced completions data to automatically identify events or extract useful parameters from the data, such as a breakdown pressure, diverter and pressure response from the same, and offset pressure response, of a sequence within the data and using higher order channels.

BACKGROUND

Time-series data is used in various domains of the oil and gas industry, such as drilling, completions and hydraulic fracturing. Generally, time-series data includes logs and/or streaming data from various sensors dispersed throughout a well site. The time-series data is used to identify and respond to events, plan drilling, treatment, hydraulic fracturing, and other operations, and perform various other important drilling, completion and hydraulic fracturing related activities.

However, time-series data is often treated inconsistently and/or processed through manual analysis, leading to inconsistent results and application of the results. Moreover, manual processing can only discern relatively obvious features of the time-series data and is limited to the channels native to the time-series data unless significant time and effort is dedicated to further processing the data. In addition, even seemingly obvious features can be missed or misidentified in unconventional formations where data may act quite differently from conventional formations, where different operators apply different parameters resulting in different behavior and accordingly different data behavior, and the like. As a result, accuracy and speed of the analysis cannot take into consideration hidden features, such as higher order or derived data channels, and so are reduced or incomparable as a consequence.

It is with these observations in mind, among others, that various aspects of the present disclosure were conceived.

SUMMARY

Aspects of the present disclosure involves computer implemented methods, processing systems and computer executable instructions set forth on a non-transitory computer readable medium. Various aspects involve obtaining well data, which may be time series data, from various sensors associated with drilling operations, and completion and hydraulic fracturing operations. The sensors and data may be obtained from downhole equipment such as measurement while drilling sensors, sensors along the well bore, sensors positioned within stage, and from sensors and equipment above ground such as associated with pump trucks and the like.

In one example, the method, system and computer executable instructions access well data comprising a series of pressure values of a well corresponding to a time when a well is being hydraulically fractured. The system generates a series of rate of change of pressure values for the series of pressure values and identifies a peak value from the series of rate of change of pressure values.

In another example, aspects of the present disclosure involve a non-transitory computer readable medium comprising computer executable instructions what, when executed by a processor, perform the following: access well data comprising a series of treating pressure values and a series of corresponding slurry rate values for a time while a well is being hydraulically fractured; generate a series of rate of change of treating pressure values for the series of treating pressure values; generate a series of corresponding rate of change of slurry rate values for the series of slurry rate values; and set a breakdown pressure for a peak value in the series of rate of change of treating pressure values when the rate of slurry rate value corresponding to the peak value indicates a substantially constant slurry rate.

In another example, aspects of the present disclosure involve a non-transitory computer readable medium comprising computer executable instructions what, when executed by a processor, perform the following: access well data comprising a series of treating pressure values for a well being hydraulically fractured; access well data comprising a series of corresponding slurry rate values for a time while a well is being hydraulically fractured; generate a scaled series of rate of change of treating pressure values for the series of treating pressure values; generate a scaled series of corresponding rate of change of slurry rate values for the series of slurry rate values, with the scaled series of rate of change of treating pressure values scaled to match the scaled series of corresponding rate of change of slurry rate values; combine the scaled series of corresponding rate of change of slurry rate values for the series of slurry rate values, with the scaled series of rate of change of treating pressure values and set the diverter as a highest peak in the combined channel where the rate of change of the slurry rate indicates a substantially constant slurry rate.

In another example, aspects of the present disclosure involve a non-transitory computer readable medium comprising computer executable instructions what, when executed by a processor, perform the following: access a series of offset pressure values from a monitoring well; access a series of corresponding treating pressure values for a time while a well is being hydraulically fractured in a same formation as the monitoring well; generate a second derivative channel for the series of offset pressure values from the monitoring well; identify values in the second derivate channel corresponding with a time window when a stage is being completed in the active well and indicating a positive change in the offset pressure; and generate a fracture interference pressure response based on the positive change in the offset pressure. The instructions may further involve generate the fracture interference pressure response based on a difference between a low offset pressure within the time window and high offset pressure within the time window.

In another example, aspects of the present disclosure involve a non-transitory computer readable medium comprising computer executable instructions that, when executed by a processor, perform the following: access well data comprising a series of treating pressure values and a series of slurry rate values of a well corresponding to a time when the well is being hydraulically fractured; preprocess the series of treating pressure values and the series of slurry rate values; generate a first rate of change value in the treating pressure channel and a second rate of change value in the treating pressure channel, and identify an abnormal pressure change value when the first rate of change exceeds a threshold and a rate of change of the slurry rate channel falls below a threshold indicating a steady slurry rate; correlate the abnormal pressure change with at least one automatically identified event during the time when the well is being hydraulically fractured. In one example, the well data is a real-time stream of the series of treating pressure values and the series of slurry rate values. In one specific example, the series of treating pressure values and the series of slurry rate values are sampled at 1 Hz or some other sampling rate, and the instructions are further arranged to downsample the well data comprising the series of treating pressure values and the series of slurry rate values.

The instructions may further be arranged to access well data comprising a series of bottomhole proppant concentration values and a series of chemical values of the well corresponding to a time when the well is being hydraulically fractured; generate a rate of change in the series of bottomhole proppant concentration values and a rate of change in the series of chemical values; correlate the abnormal pressure change with at least one of the rate of change in the series of bottomhole proppant concentration values and the rate of change in the series of chemical values; and generate a well completion parameter change based on at least one of the correlations.

These and other aspects of the present disclosure are discussed further below.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

FIG. 2 is a flowchart illustrating one method of processing and acting on well treatment data according to one embodiment of the present application;

DETAILED DESCRIPTION

Aspects of the present disclosure involve automatically identifying various events in drilling and completion data streams. Events may be related to breakdown pressure, diverter, proppant steps, offset pressure, and abnormal pressure changes among others. Additional aspects involve identifying a possible cause, or correlation, and effect within a well or between wells while drilling or completing a well. In one example, the system automatically identifies events in an active well, events in an offset well, and correlates those events. In another example, the system automatically identifies abnormal pressure increases in an active well, identifies various other events occurring in the active well, and correlates those events. The system may further generate various actions based on the correlation that may remediate possible suboptimal completion actions and/or reduce or prevent subsequent suboptimal completion actions. The system further takes various actions to preprocess the data to improve processing efficiency and increase accuracy, which are advantageous in any analysis of the well completion operations and particularly advantageous when analyzing and optimizing performance in real-time situations.

Aspects of the present disclosure involve a method and system for automating the identification of breakdown pressure, diverter events and offset pressure, in time sequenced fracture data. Unlike previous methods or workflows to automate various selections, the disclosed breakdown pressure flag automation, diverter and offset pressure, use a heuristic approach in lieu of complex machine learning techniques, although machine learning could be applied to further process the data or supplement the techniques discussed herein. As the breakdown, diverter, and offset pressure data behavior may be diverse due to the different data sources such as varying pumping schedules, formations, service providers, etc., achieving a method to find a "constant pattern" across the dataset may be advantageous to data analysis procedures.

Figure 1:
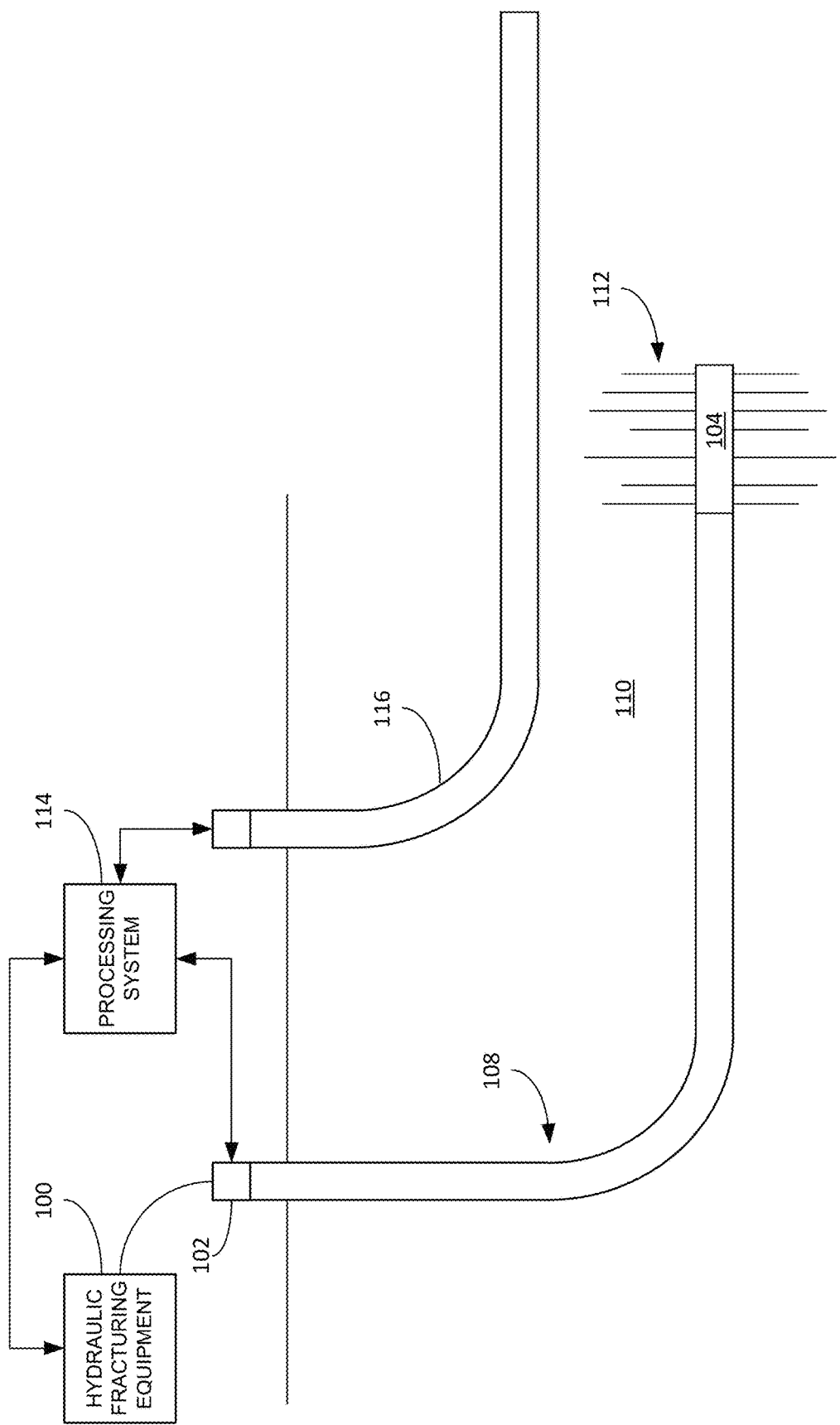
FIG. 1 is a system diagram illustrating a processing system coupled with a hydraulic fracturing system coupled with a well to hydraulic fracture a stage of the well, with the processing system to collect well processing data and process the same, according to one embodiment of the present application.

FIG. 1 is a system diagram according to aspects of the present disclosure. The system diagram is representative of a hydraulic fracture system 100 operably coupled with a well head 102, and set up to hydraulically fracture stages 104 of a horizontal section 106 of a wellbore 108. The hydraulic fracturing equipment may include pump trucks, sources of water (e.g., water trucks), and sources of proppant, diverter, and other substances that may be combined with water and injected into the well as part of the fracturing process. In some configurations, a pump truck is connected to the well head 102 and pumps, under controlled pressure and rate, the hydraulic fracturing fluid into the well which flows through a well casing (not shown) to the stage 104 being hydraulic fractured, and the fluid fractures the formation 110 surrounding the stage at perforations formed in the casing to form fractures 112. In some systems discussed herein, data and interactions with an offset well 116 may further be assessed. The offset well may be fitted with various possible sensors for measuring pressure, e.g., tubing pressure in one example, within the well or within some portion or portions of the well. The well and the equipment involved in the hydraulic fracturing process may include sensors, gauges, and other devices to monitor and record data associated with the hydraulic fracturing processes. The data may then be reported and stored at a processing system 114. The processing system may involve one or more computing devices, at the well site or remote therefrom, and combinations of the same. The processing system may be in wired or wireless communication with various aspects of the well and/or the fracturing equipment.

Breakdown Pressure

Breakdown pressure is the pressure at which fluid injected into a perforated borehole fractures the formation and allows fluid to open the fractures. Hydraulic fracturing, as would be expected, is generally conducted at or above the breakdown pressure of the formation surrounding the borehole. The breakdown pressure is also used to obtain formation stress measurements. In some instances, the maximum horizontal stress can be calculated from the breakdown pressure, the minimum principal stress and the properties of the rocks of the drilled formation. When interpreting micro-hydraulic fracturing data for in-situ stress determinations, the value of the breakdown pressure (on a first or subsequent injection cycle) is generally used in conjunction with the instantaneous shut-in pressure.

FIG. 2 is a flow diagram illustrating operations involved in various embodiments of the present disclosure. In various embodiments, operations may be rearranged, operations may not be performed etc. Additionally, various embodiments may perform operations differently or add operations as discussed herein.

Figure 3:
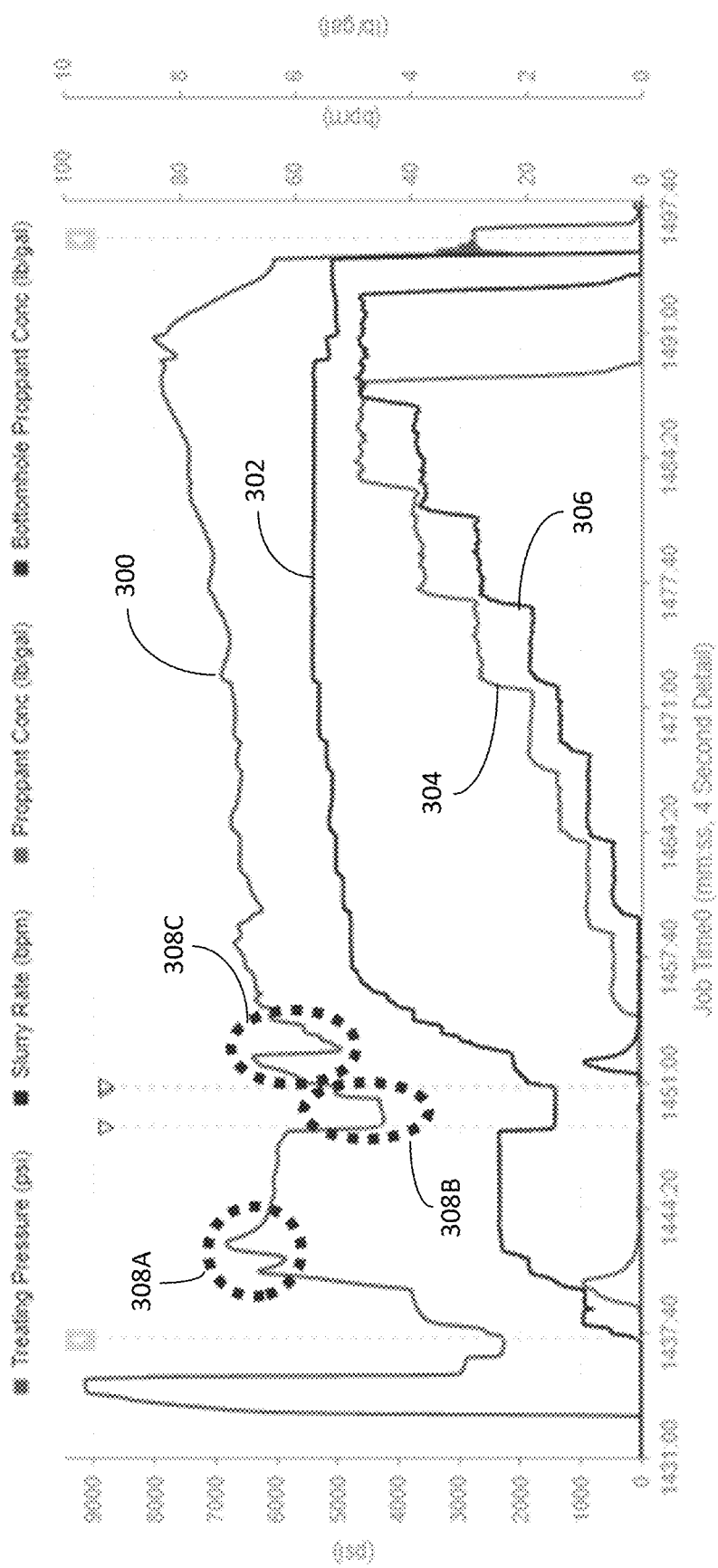
FIG. 3 is a diagram of time series well treatment data plots of treating pressure, slurry rate, proppant concentration and bottomhole proppant concentration for a well stage being treated, with areas where breakdown pressure may be identified and misidentified.

Referring to FIG. 2, the method involves accessing treatment data (200). FIG. 3 is a diagram depicting various curves associated with hydraulic fracturing a stage of a well in an unconventional reservoir. In the present embodiment and referring to FIG. 3, the illustrated channels are treating pressure (recorded in pounds per square inch (PSI)) 300, slurry rate (recorded in barrels per minute (BPM)) 302, proppant concentration (recorded in lb/gal) 304 and bottom-hole proppant concentration (recorded in lb/gal) 306. This data may be obtained from various sensors and gauges associated with the hydraulic fracturing system 100 or the well head 102 or otherwise. The horizontal axis is "job time"

recorded as time scale in minute (mm):second (ss) scale. Breakdown pressure is typically associated with a pressure hump 308A (portion of treating pressure curve with dashed circle) at the beginning of hydraulically fracturing a stage while the slurry rate is constant. In unconventional reservoirs, however, due to their complexity, similar pressure humps (portions of treating pressure curve denoted by dashed circles 108B and 108C) may occur several times complicating the task of automated identification of breakdown. Further, the breakdown pressure behavior in different wells and in different formations may vary greatly. Moreover, breakdown pressure behavior may be highly affected by the slurry rate, such that if one service provider is pumping the fracture treatment differently than another, the pressure behavior will be different. For any of these reasons, among others, relying on the manual identification of when breakdown occurs and computing breakdown pressure from the details often a time consuming process that is prone to inaccuracies due to in consistent selection methods and/or interpretation of the data.

Figure 4:
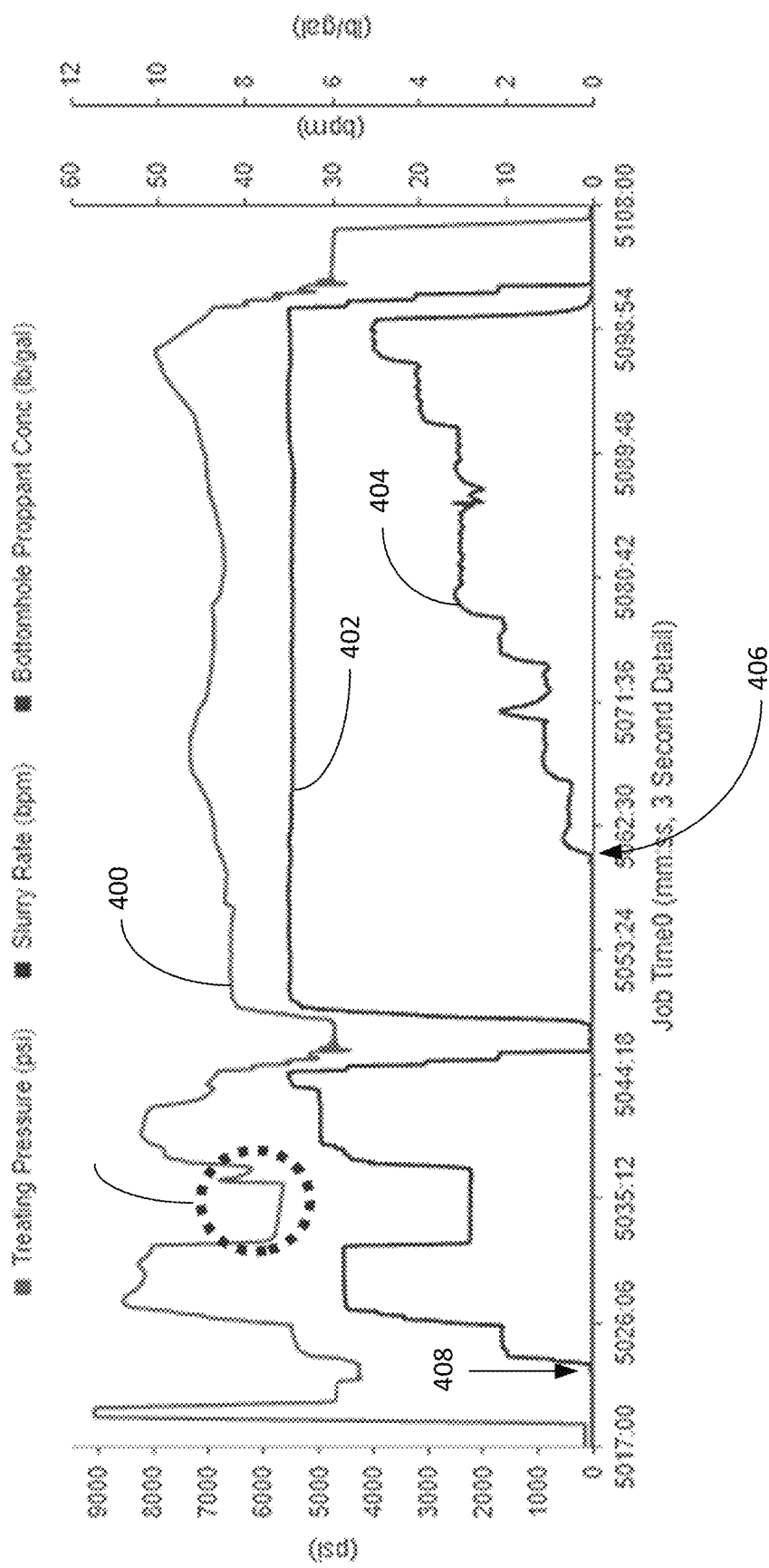
FIG. 4 is a diagram of time series well treatment data plat of treating pressure, slurry rate and bottomhole proppant concentration for a well stage being treated, with an area, according to embodiments of the present disclosure, that correctly correlates with breakdown pressure.

FIG. 4 illustrates high-frequency treatment data for a stage of a horizontal well undergoing hydraulic fracturing. The data includes data channels for treating pressure (TP) 400, slurry rate (SR) 402, and bottomhole proppant concentration (BHPC) 404. Referring to FIG. 2, the method may involve generating a higher order channel or channels from the treatment data channels. In the present embodiment, from the treatment data, the system may derive higher order channels for rate of change of treating pressure (TP') and the rate of change of slurry rate (SR'). These higher order channels are added to the data frame including the treatment data, organized and aligned by time. In some instances, the rate of change channels are computed from the first derivative of the respective values of each of the TP and SR channels.

Figure 5:
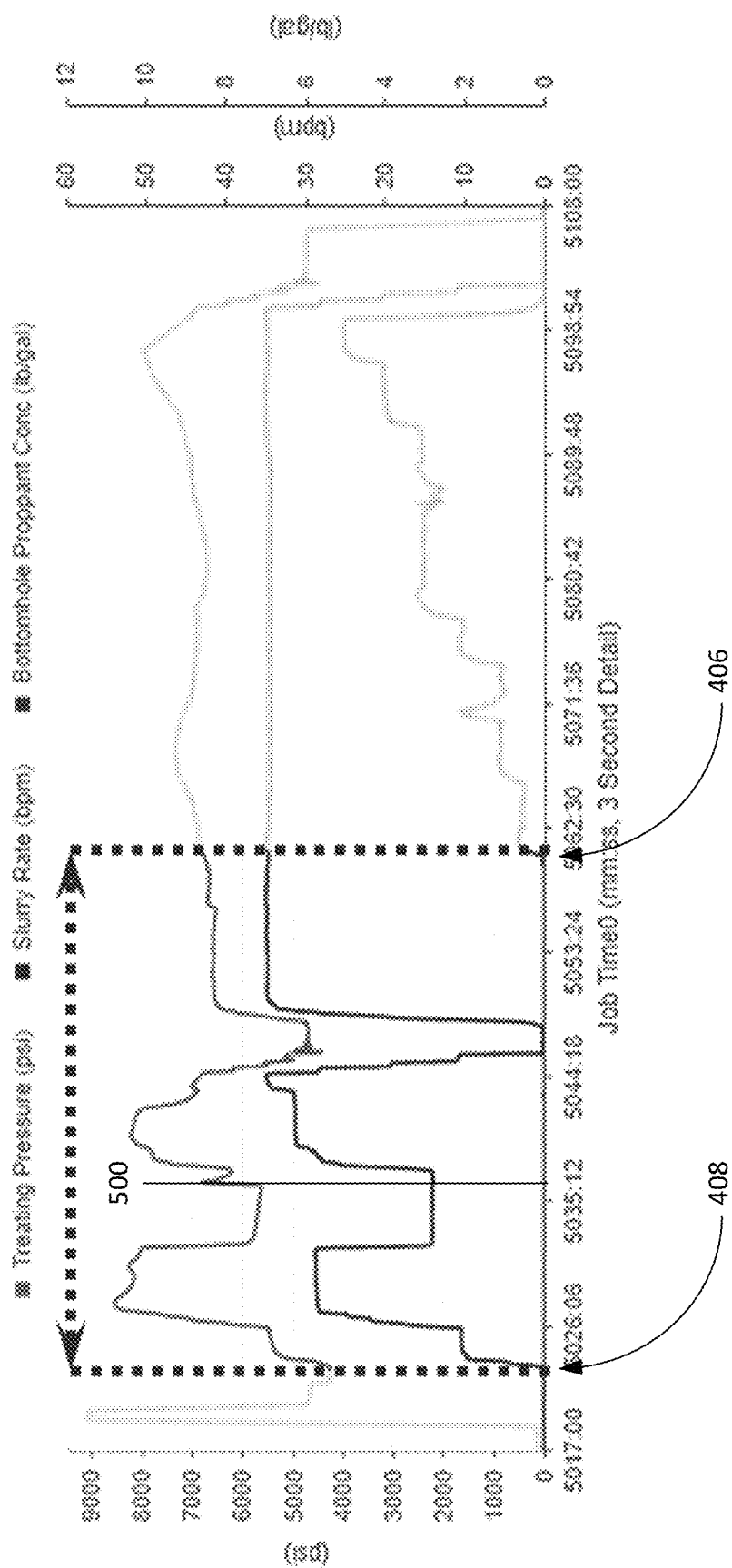
FIG. 5 is a diagram of the time series well treatment data of FIG. 4, with a reduced time window generated according to embodiments of the present disclosure, to reduce the areas of the treatment data to process where breakdown pressure may occur.

Referring to FIG. 2, the method may involve filtering the data (operation 206) to reduce processing complexity and/or to reduce the likelihood of generating false positives. In the case of identifying breakdown pressure, in one example, the system may generate a subset of the dataset including the data points from some start time, e.g., time 0 or otherwise the beginning of the data set, until the BHPC is at some value indicative of a non-zero concentration (e.g., 0.22 lb/gal). In the case of identifying breakdown pressure, the breakdown pressure occurs while the BHPC is zero. Thus, the data after the BHPC rises above zero 206 can be filtered out (e.g., removed from the subset). FIG. 5 includes the same data channels as illustrated in FIG. 4, with a first vertical line at the point 406, and the data to the right (the values in time after the point 206) are removed to form a subset. The value of 0.22 lb/gal is one possible value but other can be chosen as well. However, if a channel for BHPC does not exist in the dataset, then the first 30 minutes of data for that dataset may be used or some other amount of data relevant to the well data being processed and such that the data will encompass the time when breakdown pressure occurs.

The data may be further reduced and filtered, to further isolate the data most likely to contain the feature of interest (e.g., to further isolate the data during the time when breakdown is likely to occur). In one example, the subset of data is further filtered to retain the data where the slurry rate is greater than 0 bpm and less than 35 bpm. This range is considered to encompass the area where breakdown may occur, and the breakdown pressure captured in the treating pressure data. In FIG. 5, a second vertical line is shown where the slurry rate is begins to rise 408 and is greater than 0. The SR data to the right of the second vertical line is less than 35 BPM. The data preceding the second vertical line is removed from the subset. Hence, after the two data reduction steps, the subset contains the data between the first and second vertical lines (the data associated with the times between the first vertical line and the second vertical line). It should be noted that the vertical line is merely a way to illustrate where filtering of the data occurs.

Referring again to FIG. 2, from the filtered data set, the system identifies the feature of interest (operation 208). In more detail and relative to the present embodiment, from within the subset, the system identifies the breakdown pressure by finding the highest (peak) TP value where the slurry rate is constant. In one example, the system generates the higher order TP' and SR' values for the subset. However, the higher order channels may be computed for the original dataset and the higher order channels retained only for the subset based on the process discussed above. To find the highest TP where SR is constant, the system uses the TP' and SR' values. In one example, the system first identifies the largest magnitude TP' values (e.g., the peak TP' values) and assesses those peak values in order from highest to lowest, and each is compared to the corresponding SR' value (e.g., the SR' value at the same time). In one example, the treating pressure at the highest TP' value where the SR' value is 0 or substantially zero (e.g., within a threshold of zero) is set as the breakdown pressure.

Figure 6:
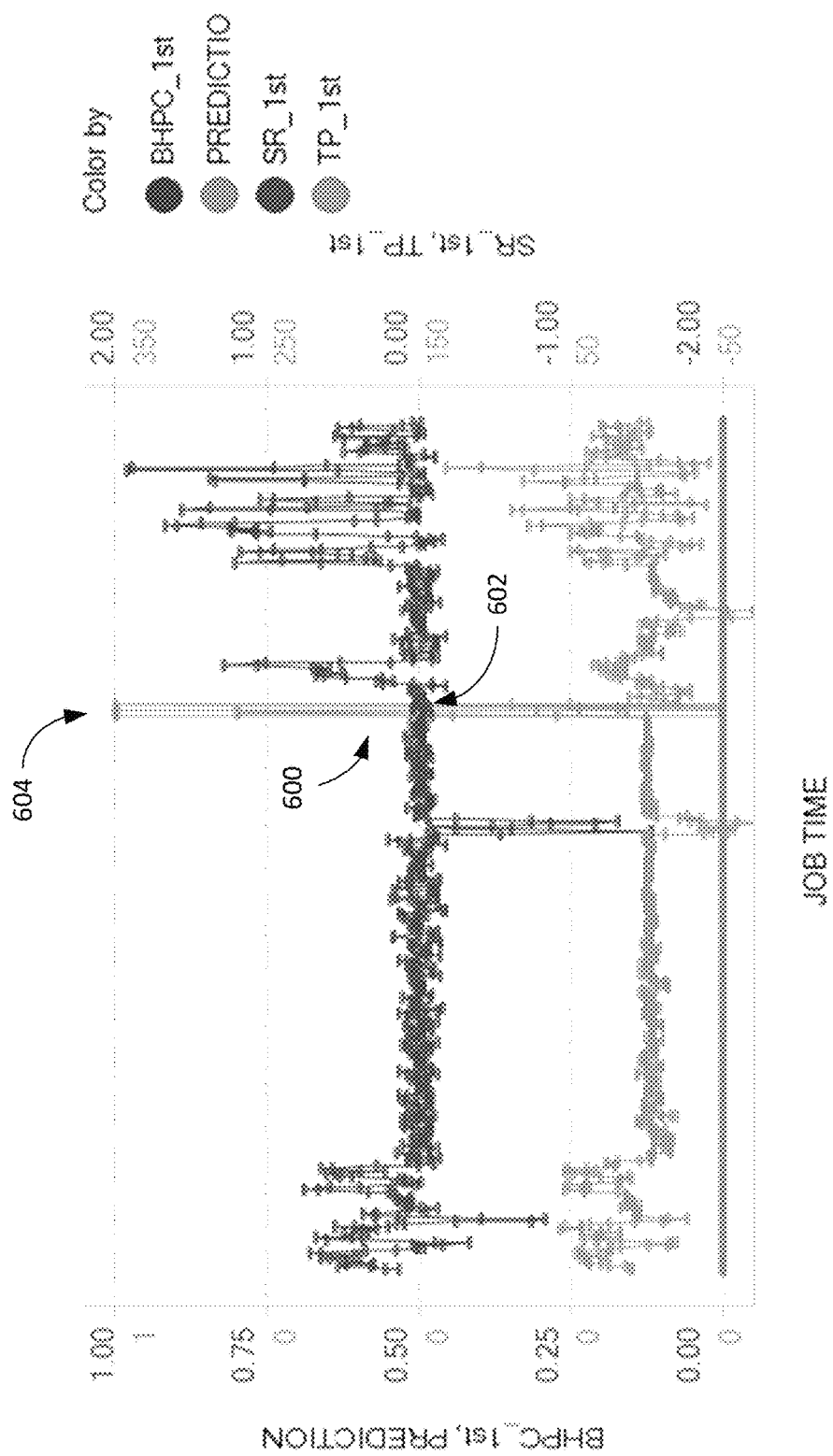
FIG. 6 is a diagram depicting predicted breakdown pressure locations at peak values of the first derivate of the treating pressure and constant values of the slurry rate, according to one embodiment of the present disclosure.

FIG. 6 is a graph of the TP' and SR' values for the subset of data. It can be seen that there are several peaks 600 in the TP' values clustered near the same time where the SR' values 602 are zero or nearly zero. In FIG. 6, in the same area where the TP peaks are shown, there are predicted breakdown pressure locations 604. This behavior can be expected as the treating pressure spike associated with breakdown pressure may be noisy and may occur over a period of time and thus be captured at different points in time. Thus, in one specific example and to select one value as the breakdown pressure, the system assesses a first set (e.g., 5) of the highest TP' values, beginning with the highest value, to determine if any are associated with a constant slurry rate (e.g., at SR' equal or nearly equal to zero). The system picks the highest TP' value where SR' is constant. If the first set does not yield a breakdown pressure, the system assess a following second set (e.g., 35) and then, if not breakdown pressure is determined, another set (e.g. 50) until the value is found or the system otherwise halts.

To determine if the slurry rate is constant at any particular TP' value, the system evaluates SR' values at the time of the TP' value as well as SR' values before and after the TP' value to determine if the slurry rate is indeed constant or noise in the system simply suggesting the slurry rate was constant. Stated differently, a discrete SR' value may be zero or within a threshold of zero simply due to noise, and should that SR' value happen to occur at a peak TP' value, it may throw a false positive. To reduce the chance of detecting a false positive, in one example, as referenced above, the original time series data (TP, SR, BHPC) and the derived channels (e.g., SR' and TP') are indexed (e.g., aligned) on the same scale, e.g., time. The system them uses the indexes for comparison purposes across data channels. In one specific example, for a TP' value at index (i), the slurry rate is considered constant when the following conditions are met:

$$-0.10 <= SR'i <= 0.10 \text{ and } SRi > 0 \text{ and}$$

$$-0.25 <= SR'i-2 <= 0.25 \text{ and } SRi-2 > 0 \text{ and}$$

$$-0.25 <= SR'i-1 <= 0.25 \text{ and } SRi-1 > 0 \text{ and}$$

−0.25<=SR'$i$+1<=0.25 and SR$i$+1>0 and

−0.25<=SR'$i$+2<=0.25 and SR$i$+2>0

Generally speaking, the slurry rate is considered constant when the SR' value at the same index as the TP' index has a rate of change between −0.1 and 0.1, and the raw slurry rate is greater than zero. The system then considers the SR' values before and after the TP'(i) value being assessed; in this example, at two indexes (i−2 and i−1) before and two indexes (i+2 and i+1) after. If the SR' values show a rate of change within + or −0.25, while the slurry rate is greater than zero, the system considers the slurry rate to be constant at the assessed TP' value. The system may assess more or less SR' values and/or apply other thresholds in different possible implementations.

Referring again to FIG. 6, for each peak 600, the SR' values 602 indicate a constant slurry rate. Thus, initially, within the first set of peak TP' values, there are several correlated to a SR' near zero. The system selects the highest TP' value and marks the dataset for the treating pressure as the breakdown pressure, and also generates a flag 500 for display in a graphical user interface depicting the data the corresponding treating pressure as the breakdown pressure.

However, to further refine the technique, upon finding one or more matches within one of the sets, the system may add a larger time window around the peak value, before and or after the matching index value or values (e.g., 18 seconds) and generate a new list of TP' values to asses. The addition of values before and after the highest initial TP' value or set of TP' values helps to identify the highest TP value where breakdown occurs and that may not otherwise be captured. From the new list, the maximum treating pressure value where the change in slurry rate is substantially zero is returned as the breakdown pressure. In one possible example, a flag or other marker is set in the original data set such that display of the same delineates the breakdown pressure.

Diverter

Diverter is typically a chemical agent or a mechanical device used to temporarily bridge or otherwise plug the areas of the well taking fluid and enable the redirection of the fluid to under-stimulated intervals. Stated differently, during hydraulic fracturing, diverters plug perforations taking fluid to redirect the fluid to other perforations with the objective of improving fractures emanating into the formation at those previous perforations. For advanced completion designs (complex fracture networks), the goal is not to just increase the stage count but to increase the number of initiation points (perforation clusters) that are effectively stimulated increasing the contacted fracture surface area. Completion designs that utilize diverters have resulted in a dramatic increase in the number of fracture initiation points. Once the area (e.g., a stage) is uniformly stimulated, the diverters dissolve over time, when in contact with water or oil, or with temperature changes.

Figure 7:
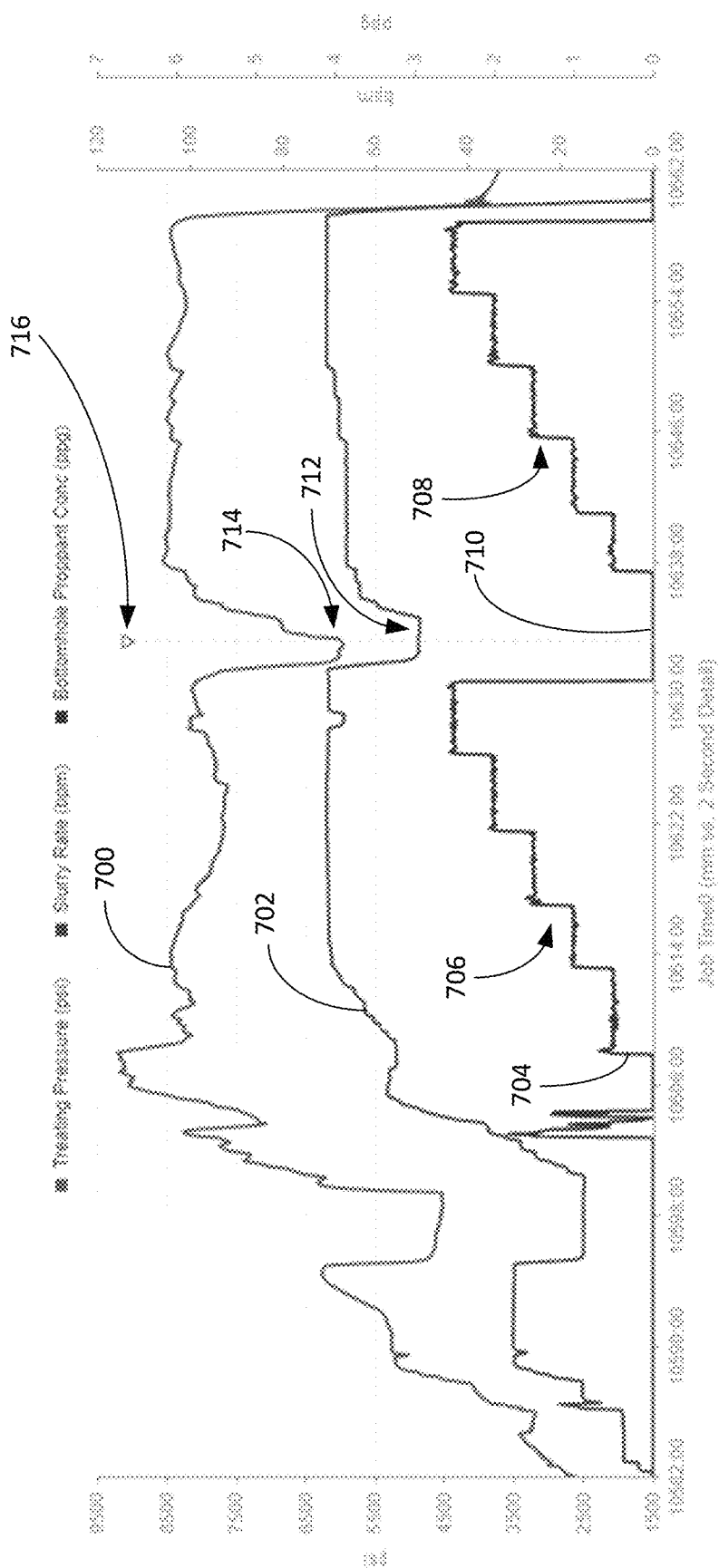
FIG. 7 is a diagram of time-series data of treating pressure, slurry rate and bottomhole proppant concentration illustrating a location of when diverter has begun acting in a stage.

A sudden increase in treating pressure when the diverter agent reaches the perforations is an indicator of its effectiveness. In effect, when a diverter plugs a perforation, the fluid flowing into the previously open perforation is blocked and pressure starts to build until the fluid meets the breakdown pressure at one more additional initiation points and starts again to flow into the newly formed perforation. Returning to FIG. 2, the system first gather data relevant to finding the feature of interest (operation 200). FIG. 7 illustrates the general conditions associated with diverter having caused the initiation of a new fracture. For diverter, FIG. 7 includes data channels for TP 700, SR 702 and BHPC 704 (measured in ppg). FIG. 7 illustrates two sets of proppant steps 706, 708—the step behavior in the BHPC pressure values between zero and some value, and then back to zero. In between the first set and the second set of proppant steps, and generally between proppant steps, when bottomhole proppant concentration (BHPC) is zero 710 (where zero may include values within some threshold of zero), the slurry rate during typical completion operations should be fairly constant 712 and there should be a significant increase in treating pressure 714, illustrated by the abrupt upward slope of the treating pressure, when the diverter has reached the perforations taking fluid and has begun diverting fluid to new perforations. Being able to locate the specific time when the diverter reaches the perforations, and separately quantify the pressure change associated with initiation of one or more new fractures from the new perforations, allows the completions engineer to estimate if the diverter was successful or not successful and for the hydraulic fracturing system to adjusted to any number of possible parameters in the following stages or in a subsequent well being completed in the same formation.

One aspect of the present technology involves automating the identification of when diverter has reached perforations in a stage and begun to have an effect—referred to as a diverter flag 716. Similar to the identification of breakdown pressure, the diverter flag automation involves using a heuristic approach in lieu of machine learning techniques. First, the system obtains high-frequency treatment data for at least one stage of a well undergoing completion but preferably for several stages (operation 200). The data file may include treating pressure (TP), slurry rate (SR), and bottomhole proppant concentration (BHPC).

In one example, the system focuses on the rate of change of both channels to identify where the rate of change of TP and SR are greatest, and the slurry rate is constant. The system generates new, higher order, channels by obtaining the rate of change of treating pressure (TP') and the rate of change of slurry rate (SR') (operation 202). There may be noise in the signals and the system thus may filter the noise. In one specific implementation, the system applies a 45 second, or some other time window, simple moving average (SMA) to the data (operation 206).

Unlike for breakdown pressure, the system here combines the rate of change channels (operation 204). Generally speaking, in the time when diverter is taking effect, the slurry rate of change should be delayed relative to the treating pressure rate of change. Combining the channels may allow the system to better discern when only the treating pressure is changing and slurry rate is constant, indicative of when diverter is taking effect, as compared to when both the treating pressure and the slurry rate are changing, which occurs after diverter takes effect. However, treating pressure and slurry rate have different measurement values—psi and bpm, respectively. To combine the rate of change values, each is normalized or otherwise scaled to a magnitude/valueless parameter (operation 204). In one example, the system combines the scaled channels, and analyzes the combined channels to identify the highest peak (operation 208). The system may set the diverter flag at the time when the slurry rate is also substantially constant. As noted herein, SR may be noisy and hence some threshold for rate of change, both plus or minus, may be acceptable and considered constant.

Figure 8:
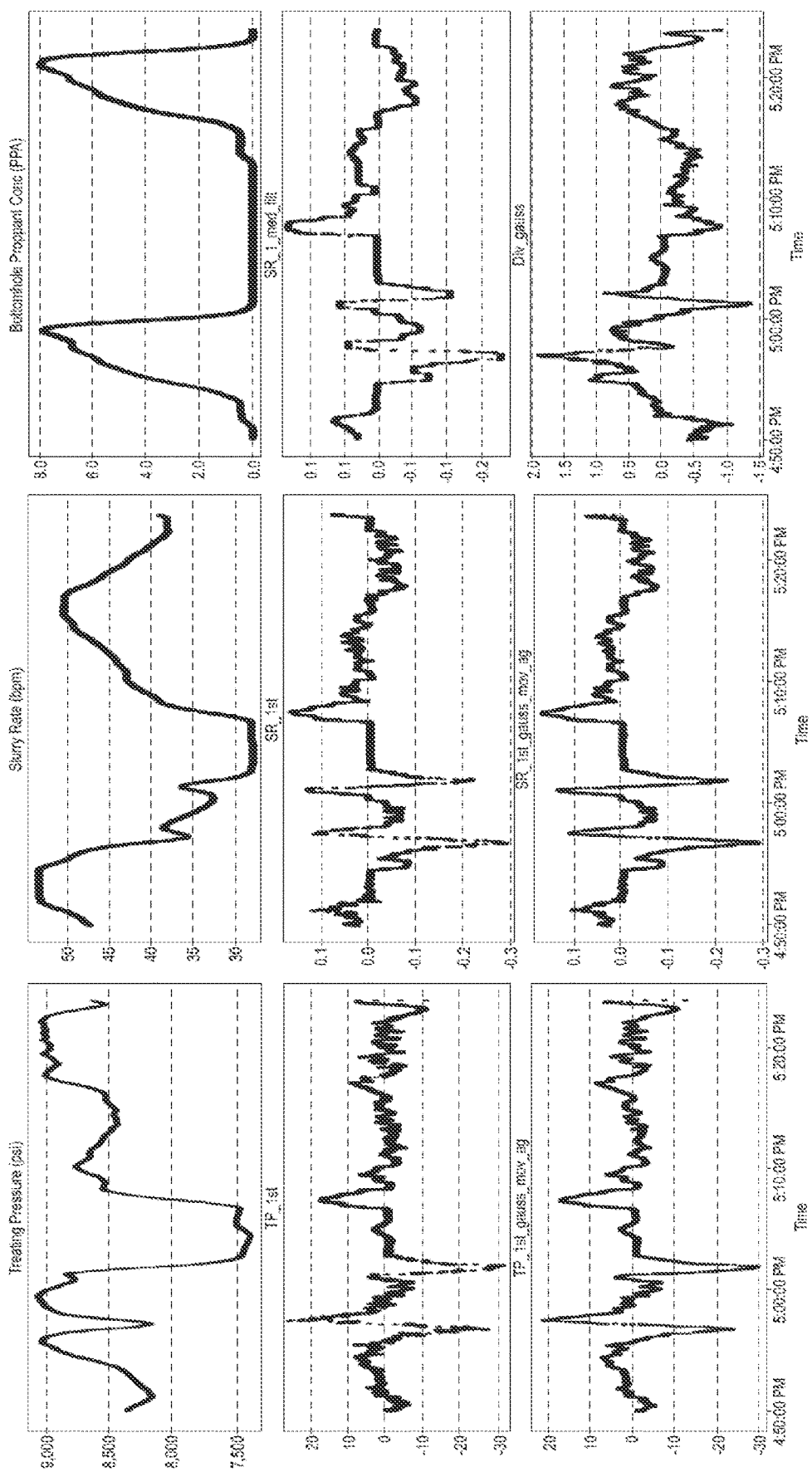
FIG. 8 is a diagram of various channels, raw and derived, that may be obtained, generated, and/or combined to identify a diverter location and the pressure response from such a diverter, according to one embodiment of the present disclosure.

FIG. 8 is an example of the various additional channels that may be added to the data frame. In more detail and in another embodiment, the system adds the new data channels, TP' and SR', to the data frame. In one specific example, the TP' and SR' channels may be further processed to generate additional channels. Namely, as illustrated in FIG. 8, from the TP' and SR' channels, the system may apply a Gaussian moving average to the TP' channel to generate a new TP' channel (TP_Gausss) and to the SR' channel to generate a new SR' channel (SR_Gauss) with a bandwidth for the Gaussian moving average computation equal to 39 and sigma equal to 3. In the examples illustrated in FIG. 2, another new, higher order channel, is for the median average of the SR' channel (SR' Filter) with a window of 61 seconds, which will have a step-like behavior and will help remove noise when identifying an area with constant rate. The system further generates another derived channel as the difference between the scaled TP' and the scaled SR' Gauss channel (DIV_GAUSS). The purpose of the DIV_GAUSS channel is to identify the area of the plot where the pressure and rate have opposing behaviors (e.g., pressure is increasing while rate is constant). During operations where diverter is not being deployed, the pressure behavior is affected mainly by slurry rate changes; thus, if the pressure changes while the rate is constant something else is causing pressure changes (diverter blocking area of flow, fluid type changes, formation or completion effects, etc.).

Figure 9:
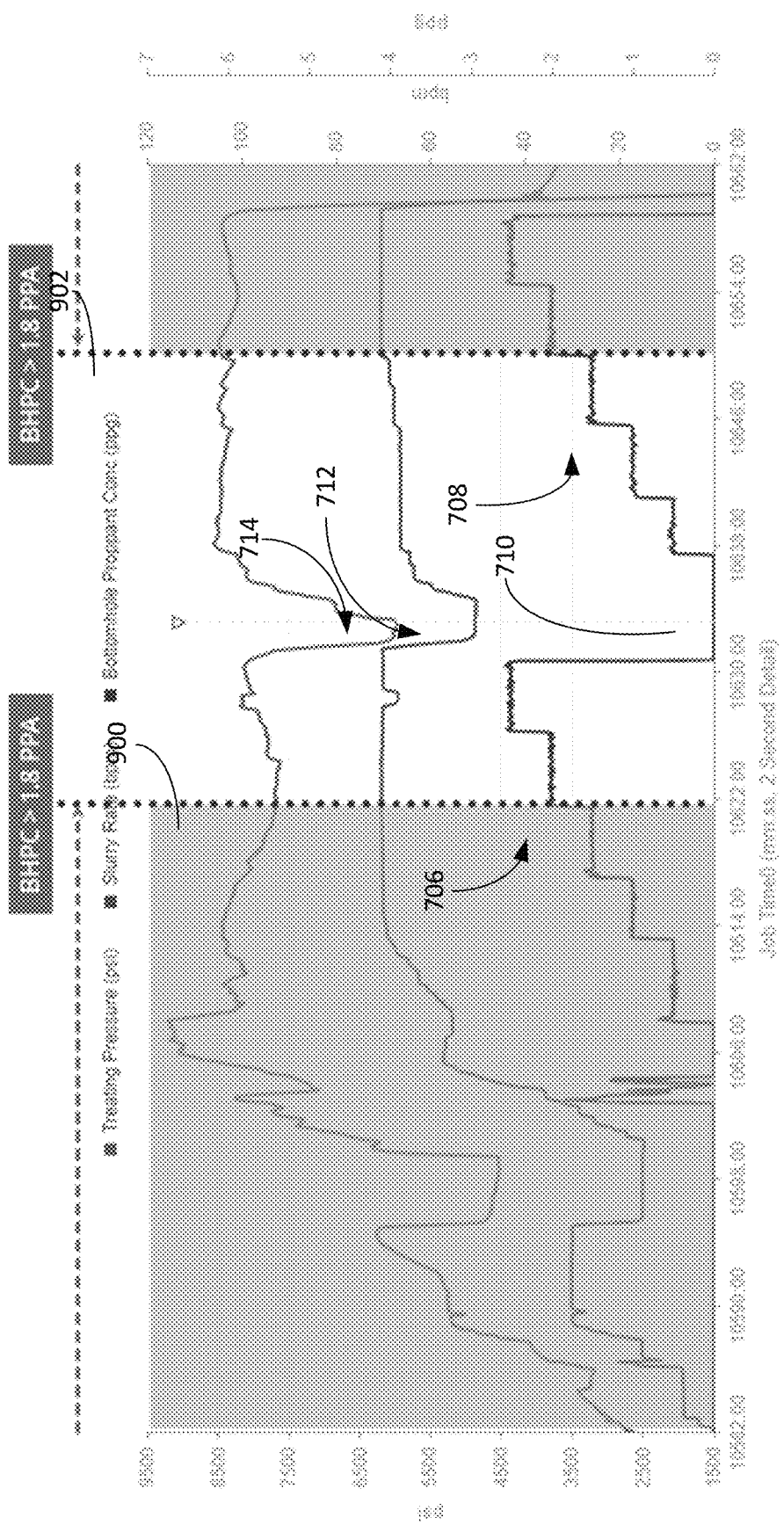
FIG. 9 is a diagram of the channels illustrated in FIG. 8, with the dataset reduced to isolate the time when diverter is most likely to cause an effect, eliminate sources of noise and/or enhance the processing efficiency and memory resources, according to one embodiment of the present disclosure.

The system focuses on the portions of the data channels were BHPC is substantially zero 712 and between proppant steps 710. One goal of the system is thus to isolate the parts of the treating plot in between proppant steps (where proppant is increasing in steps) and where the BHPC is effectively zero. To achieve these ends, in one example, the system generates a subset data frame removing the data points from the start of the data file, or some other start indication such as a start time flag until the BHPC is greater than 1.8 PPA. This point is shown in FIG. 9 at vertical line 900 and occurs in the first set of proppant steps 706. Some other BHPC value is also possible that signals the start of an increase in BHPC, and the system cuts off the data at that point. If there is no value greater than 1.8 PPA (or another value), then the system uses a computation of the difference between the maximum value of bottomhole proppant concentration and 0.1 PPA. Then, the system follows the same procedure starting from the end of the file and moving to the left towards the start of the stage. As shown in FIG. 9, the process removes the data from the end of the file until the BHPC is 1.8 PPA or greater denoted by the second vertical line 902, which occurs during the second set of proppant steps 708. As can be seen, processing retains the data between the proppant steps (between the vertical lines) including where BHPC is zero for some period 710, the rate of change of slurry rate is zero for some period 712, and there is a rapid increase 714 in treating pressure where the slurry rate is constant and BHPC is zero.

Figure 10:
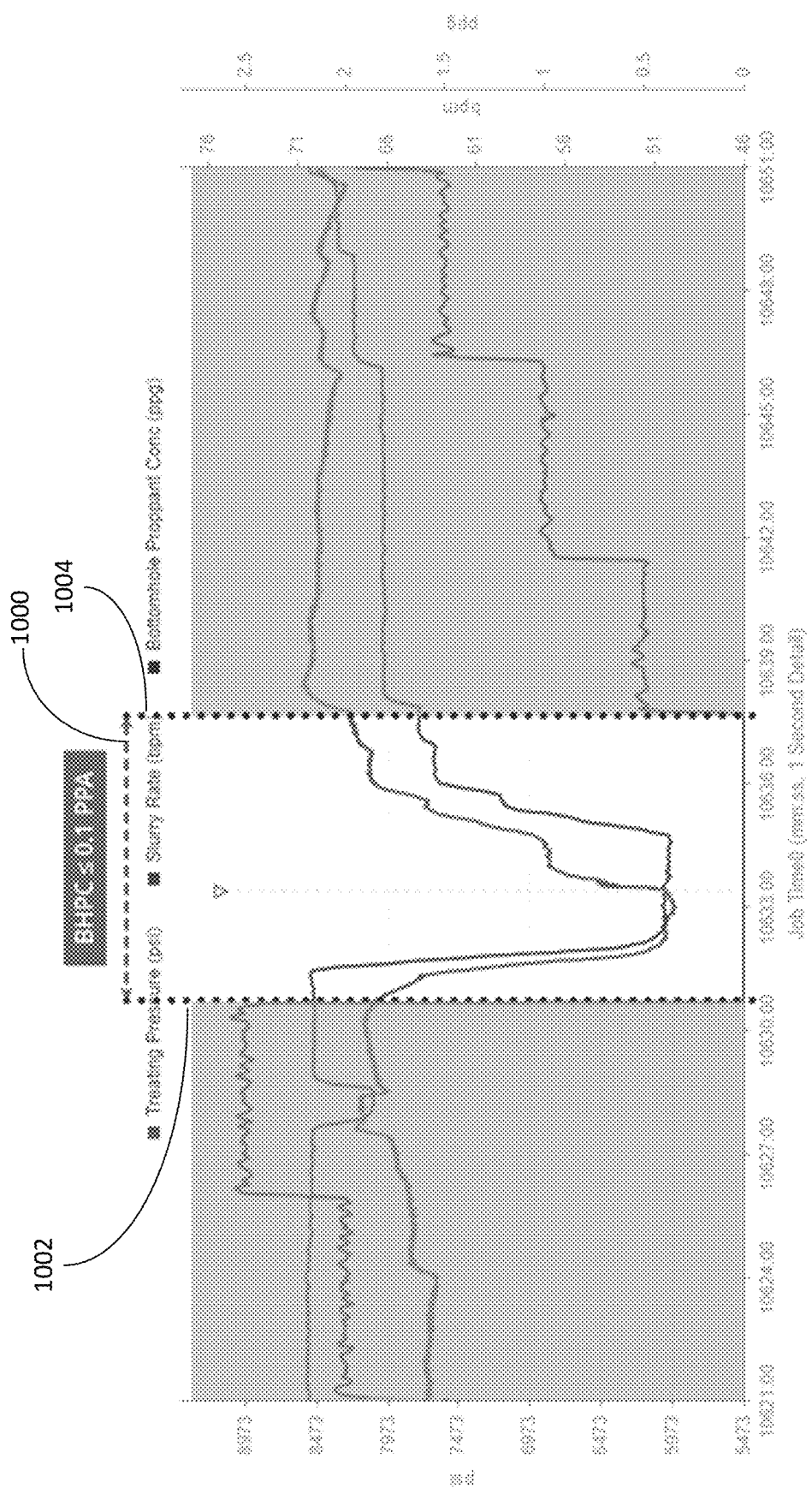
FIG. 10 is a diagram of the channels illustrated in FIG. 9, with the dataset further reduced to isolate the time when diverter is most likely to cause an effect, eliminate sources of noise and/or enhance the processing efficiency and memory resources, according to one embodiment of the present disclosure.

After the system generates the reduced data frame, the system processes the remaining data to further isolate only the data where BHPC is effectively zero. Referring to FIG. 10, in one example, the system generates a second subset data frame 1000 retaining only the portions of the data channels where the values of BHPC are less or equal than 0.1 PPA denoted by the two vertical lines 1002 and 1004. The BHPC of 0.1 recognizes that some noise may be present in the signal and 0.1 is considered effectively zero. Other filtering technique or thresholds are possible.

Figure 11:
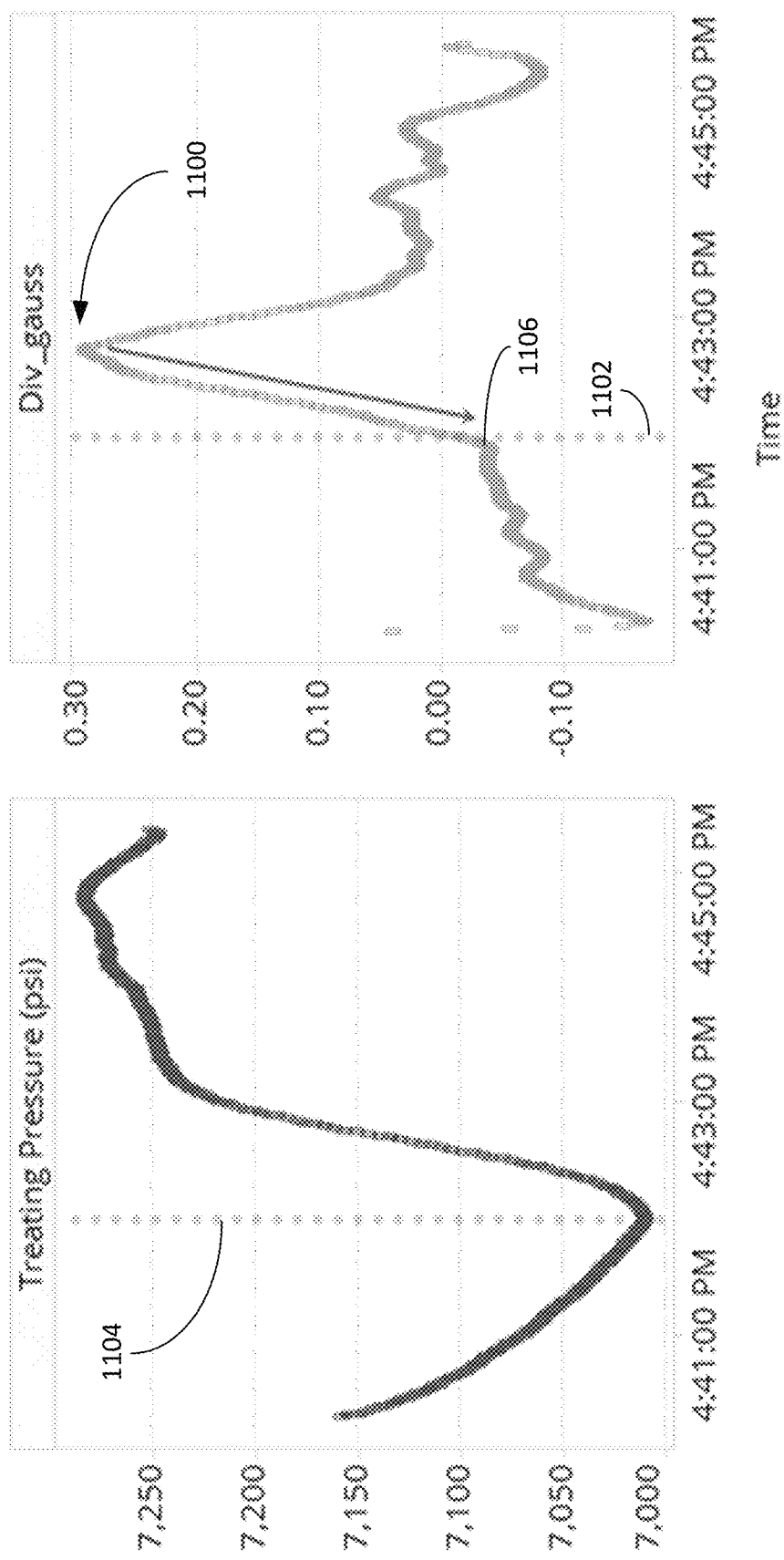
FIG. 11 is a diagram of a treating pressure channel and a higher order channel, filtered and reduced, and processed to identify a change in pressure associated with diverter and computing the pressure change caused by the diverter and used in determining diverter effectiveness, from which subsequent operations, completion, fracturing or otherwise, may be altered, according to one embodiment of the present disclosure.

To further reduce the data to the areas where slurry rate is constant, a filter may applied to the slurry rate derivative median average (SR_1_med_filt), removing values greater or equal to −0.035 and less or equal to 0.01. Another filter may be applied to the Div_gauss channel to greater or equal to −0.03 and less or equal to the maximum value. FIG. 11 shows one example of a final subset data frame corresponding to one diverter drop in a stage after all the filters are applied. Returning to the reduced data set illustrated in FIG. 10 and also referencing FIG. 11, after processing the data to reduce the data to the time, during a completion, when diverter would be used and detectible, the first step to identifying the diverter flag location is for the system to identify the maximum value of the higher order channel of the difference between the scaled treating pressure derivative and the scaled slurry rate derivative Gaussian moving average–the maximum value 1100 from the DIV_GAUSS channel. From the peak value, the system then assess the data preceding the maximum value (e.g., the system assesses the data moving towards the left, and identifies the first value greater than or equal to −0.03 and less than or equal to 0.15 as shown by the dashed vertical line 1102 in FIG. 11). Alternatively, the system may identify the last value before a jump in the job time greater than 1 second. Finally, the system identifies the time (e.g., job time) of the inflection point 1106 of the DIV_GAUSS channel to place the diverter flag 1104 and obtains the corresponding treating pressure value at the flag location.

Figure 12:
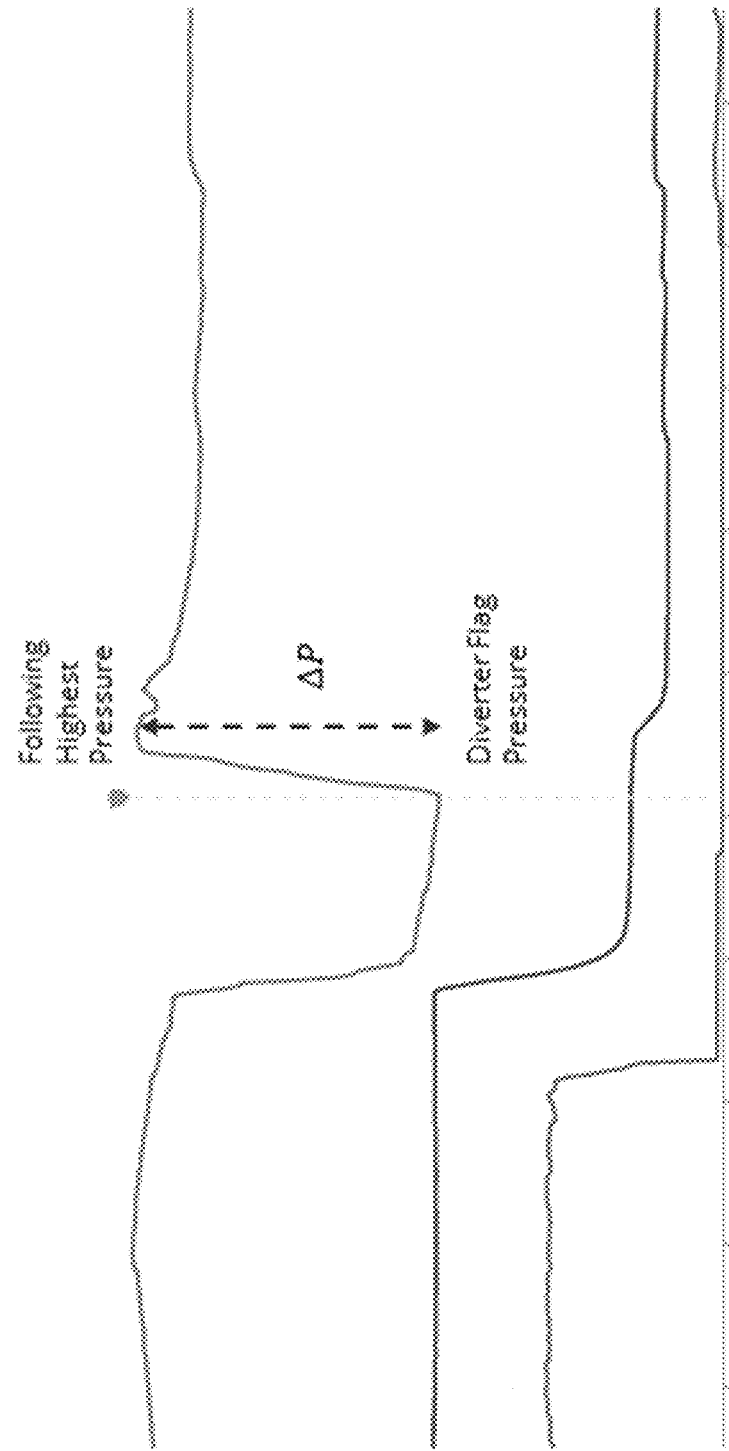
FIG. 12 is a diagram showing a diverter flag and a pressure change caused by diverter placement, according to one embodiment of the present disclosure.

Referring to FIG. 11 and FIG. 12, in one embodiment, the system further assesses whether the diverter was successful. In one example, once the diverter flag is located (and the treating pressure obtained at the time of the diverter), the system may further proceed to identify the amount of increase in treating pressure caused by the diverter and determine whether the pressure exceeds a threshold suggestive of a successful or unsuccessful diverter operation. The system, generally speaking, obtains the highest treating pressure following the diverter, with the highest treating pressure at the point where the treating pressure has stopped changing while the slurry rate remains constant. For this, the system uses a similar process described above; namely, the system moves from the maximum Div_gauss value 1100 towards the right and finds the value of Div_gauss close to zero (this is where the treating pressure has stopped changing and the slurry rate is still constant) or there is a jump of index values greater than 1 second. The system, using the time when the DIV_Gauss value is at zero, obtains the treating pressure. In one example, the system takes the difference in values (between the pressure at the diverter flag and the pressure when DIV_Guass is zero and slurry rate is constant) and sets the difference as the amount of increase caused by the diverter.

In another example, the system may further execute a refining procedure to further assess and assign the minimum (diverter pressure) and maximum pressure values. First, with respect to the diverter pressure, the refining functions takes 30 seconds before the time associated with the diverter flag and 30 seconds after (or some other threshold before and after the diverter flag), and generate a dataframe. In the new data frame, the system finds the minimum treating pressure value with its corresponding job time. In the case of the maximum diverter, the system assesses the 15 seconds before and after the time for the maximum diverter, and creates another dataframe. The system then takes the values where BHPC and SR_1_med_filt are equal to zero (or substantially zero recognizing noise) and finds the maximum treating pressure value with its corresponding job time. Next, a new data frame is created between the diverter job time and the maximum diverter job time, and the minimum treating pressure value is found within the new data frame, which will correspond to the final diverter value. A second data frame is created from the final diverter job time to the time of the maximum diverter, the maximum treating pressure value is found with the second new data frame and selected as the maximum diverter with its corresponding job time. Finally, the system calculate the pressure difference between these two values. If the treating pressure change caused by the diverter is lower than 50 psi, the system indicates that the diverter was unsuccessful, and no diverter flag is placed and other indicia may be set in the GUI. If the pressure change is greater than 50 psi, the system places the flag in the treating pressure GUI and may further display the change in treating pressure. Other pressure differentials are possible.

Offset Pressure

As discussed thus far, aspects of the present disclosure involve a method and system for generating data channels from time-series data in addition to those channels already native to the time-series data. For example, higher order channels, such as channels based on a derivative, processed through a particular mapping function, or the like, may be generated from an initial native time-series data channel or channels. In the various embodiments described herein, the derived channels may be used to provide data visualizations, such as through a graphical user interface (GUI), or for use by the system or other systems in downstream processes, such as training models or the like, for further processing and analysis, and for adjusting subsequent drilling, completion and/or hydraulic fracturing operations.

Figure 13:
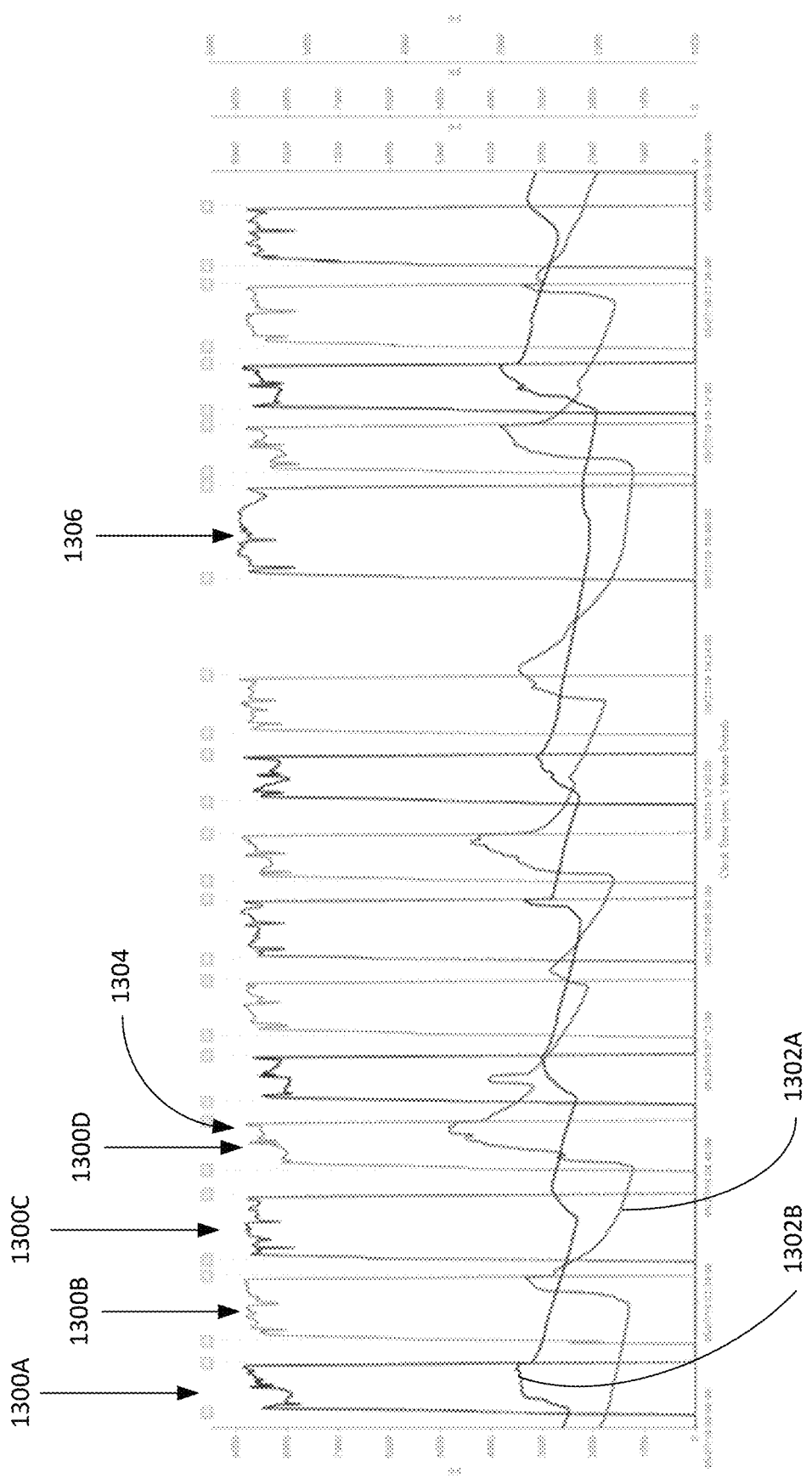
FIG. 13 is a diagram illustrating treating pressure in four different active wells (wells being hydraulically fractured) in different stages, and pressure response in two legacy wells (wells producing after fracturing) in the same formation, where some pressure responses in the legacy wells is from fracture interaction from the active wells.

In one example, a higher order channel can be generated by calculating a difference in index values and filtering out those that fall below some value (e.g., time) threshold. The channel creation and filtering can be used as part of a process for recognizing offset pressure response in a well based on sensor data. Fracture-driven interactions (FDI) involve the interaction of fractures from a well being hydraulically fractured with a nearby completed well, which is often already producing. As new wells are drilled and completed in a pad that has existing wells or otherwise as new wells are drilled in a formation near existing wells, the existing wells may sometimes receive a pressure interference or communication from fractures created in the new wells. In essence, as a fracture grows outward from a stage of a well being completed, a pressure response can sometimes be depicted in a nearby well as the fracture approaches or overlaps the existing well or fractures from that existing well. FIG. 13 is an example of pressure responses in a neighboring well caused by fracture growth from a well being completed. In more detail, FIG. 13 shows pressure channels throughout a hydraulic fracturing process for four active wells being completed 1300A, 1300B, 1300C and 1300D that are monitored alongside pressure channels 1302A and 1302B for two offset monitoring wells. The monitoring well or wells may be active wells or a well in some other state. The pressure channels for the active wells can be treating pressure whereas the pressure channels from the monitoring well can be from pressure sensors in the well, along the casing, at the surface or otherwise. Generally speaking, an increase in pressure at the monitoring well is indicative of a fracture, emanating from the active well, interacting with the monitoring well as shown by the pressure increases correlated with the various times when a well is being completed. For example, when the well associated with the pressure response curve 1400D is being completed at time 1304, it can be seen that the monitoring well for 1302A increases whereas 1302B does not, hence there is a FDI with 1302A. At 1306, neither monitoring well experiences a change.

Figure 14:
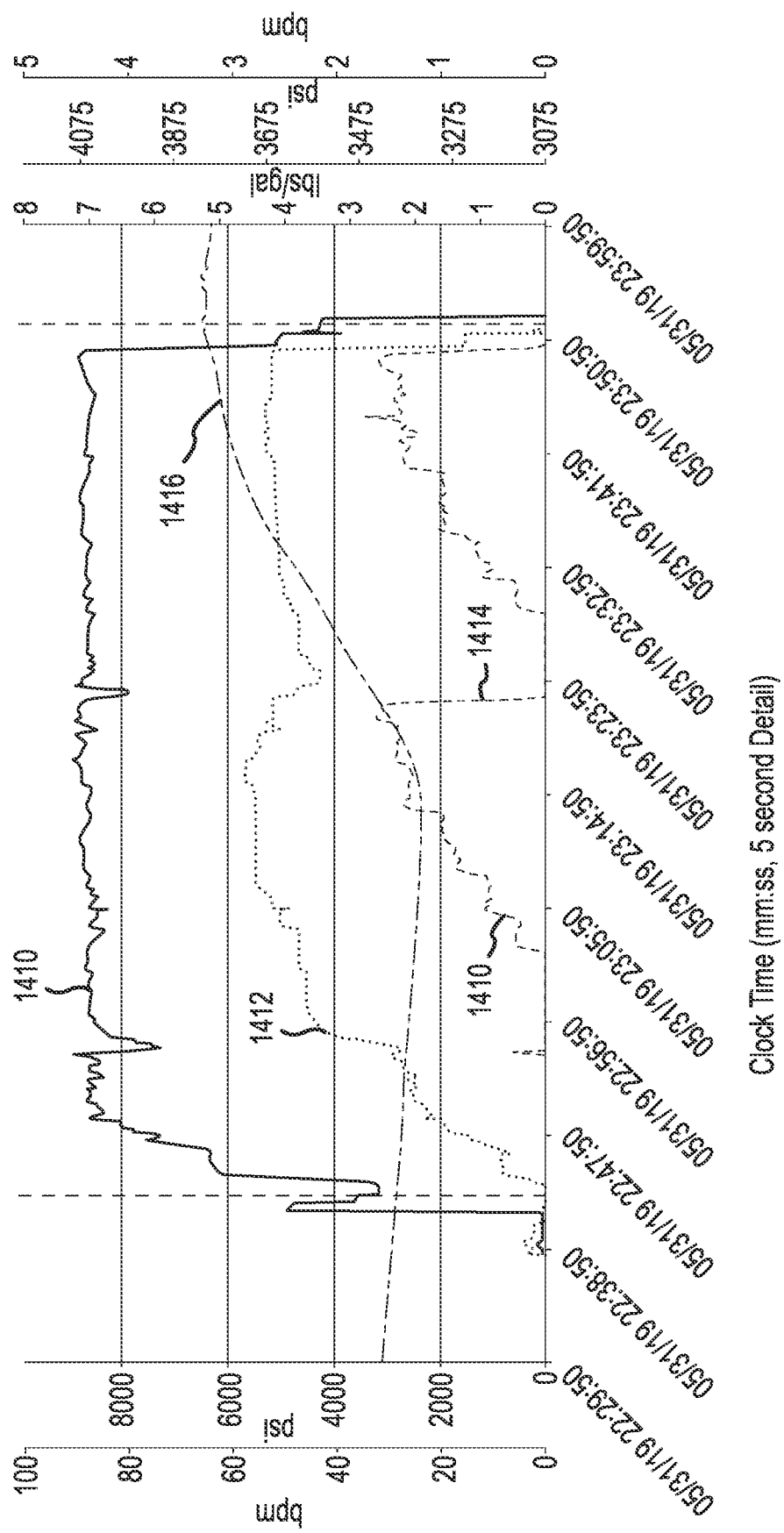
FIG. 14 is a diagram illustrating treating pressure, slurry rate, bottom hole proppant concentration and a curve of the offset pressure response from a legacy well, with the upward inflection in the offset pressure response identified according to the systems discussed herein, with the offset pressure response driven from a fracture interaction, according to one embodiment of the present disclosure.

While some fracture interactions may enhance production from an active well, in many instances fracture interactions are undesirable and to be avoided. FDI are strongly influenced by pressure depletion in legacy wells (fractures tend to follow the path of least resistance, and hence to a relatively lower pressure depleted well) and wellbore proximity, which interactions can be observed in real-time by monitoring wellhead pressure of a monitoring well during each hydraulic fracturing stage. As shown in FIG. 14 below, this behavior can be identified by observing a pressure increase in the monitoring well and may be used during a respective fracturing job to determine any effect on nearby wells.

FIG. 14 is an example of a TP channel 1410, SR channel 1412 and BHPC channel 1414 of an active well with a pressure response channel 1416 of an offset well. Generally speaking, the well is undergoing hydraulic fracturing, and the pressure in an offset well begins increasing at point 1418 suggesting a fracture interaction. The offset pressure response reaches a high value 1420 and then begins decreasing, shortly after the time that the treating pressure and slurry rate in the well being completed falls to zero. The technique discussed herein identifies when the FDI begins, when it ends, the pressure at the FDI start and the pressure difference between the starting pressure and the pressure when the FDI ends.

In one embodiment, the system is able to recognize an offset pressure FDI response in a monitoring well while a nearby active well is being hydraulically fractured. For the offset pressure response, the system employs feature engineering to generate an additional higher order channel, in addition to the native treating pressure and offset pressure response channels, and then identifies appropriate channel characteristics indicating a pressure increase in the data for the monitoring well indicative of an FDI. Generally speaking, the process can be divided into two parts although the process may be conducted without dividing into parts and the order may be changed. The first part detects events (pressure increases) in the offset pressure beginning with no pressure change (e.g., 0 PSI) and filters some upper relatively low pressure responses (e.g., from zero to 350 psi), and the second part detects events (pressure increases) in the offset pressure with relatively large pressure values (e.g., greater than 350 psi) and initiating at some offset pressure greater than zero (e.g., 350 PSI). The second part detects pressure increases at relative high pressures (e.g., 350 PSI or greater). In some instances, lower pressure responses, from 0 PSI to a relatively low pressure (e.g., 350 PSI) are difficult to detect and are often of short duration. Hence, in one example, the system analyzes lower pressure responses in distinct operations.

The data set may include job time (JT) and the pressure in the offset well, which may be, in one example, tubing pressure (TP) (operation 200). The JT is a time axis commonly used for completion data but may be any index, time or otherwise, that correlates the data channels. The JT and TP are used as the basis for the system to generate a new data frame with additional, higher order or otherwise derived channels (operation 202). In one example, the new data frame includes a higher order channel of values with the job time converted to date-time format (channel labeled "filter_time") and a new channel of data values for the second derivative of the offset pressure values (TP"). The second derivative of offset pressure highlights areas with increasing pressure (the second derivate will actually be a negative number) versus areas with no pressure change or falling pressure (zero or positive values).

The monitoring well pressure response technique is intended to recognize a pressure increase in the monitoring well while fracturing an active well. One key attribute of the technique is for the system to identify a leading edge or initial change of slope of all pressure increases in the monitoring well. Points on a leading edge of a pressure increase occur when the second derivative of the pressure ($tp\_2^{nd}$ or TP") is negative. These points are referred to as events. The technique also involves correlating the events to hydraulic fracturing activity of an active well. Finally, the technique involves determining the pressure response in the monitoring well, the difference between the pressure from the initial fracture interaction and the highest offset pressure while hydraulic fracturing is occurring.

There are edge cases where the tubing pressure is consistently very low and it is difficult to detect offset pressure responses from fracture interactions. In such cases, the technique isolates and analyzes job times where the tubing pressure is lower than 350 psi. This value can be adjusted to what the industry or operator considers to be a low pressure for a given formation, play, or pad. The algorithm identifies any pressure values that are greater than zero as an event. Events close to one another are merged into intervals and the response flag is placed at the earliest time of each interval.

In more detail relative to the edge case and referring again to the two parts of the process, for the first part addressing the edge case, the new data frame (including the raw and derived higher order channels) may be reduced to retain all the data (e.g., columns or rows of data (JT, filter_time and TP") depending on data frame organization) corresponding with a pressure value (TP) between zero and some upper limit (e.g., 350 psi) and associated with a positive change in pressure in the monitoring well. This improves processing efficiency. For the data frame pertaining to the first part, another new channel, which may be considered a filtered TP channel, is generated based on a determined difference in the index values (e.g., time points, etc.). In one example, any difference that is less than 3600 rows (equating to approximately 3600 seconds or 1 hour) is retained and greater differences are excluded, again enhancing processing efficiency.

Figure 15:
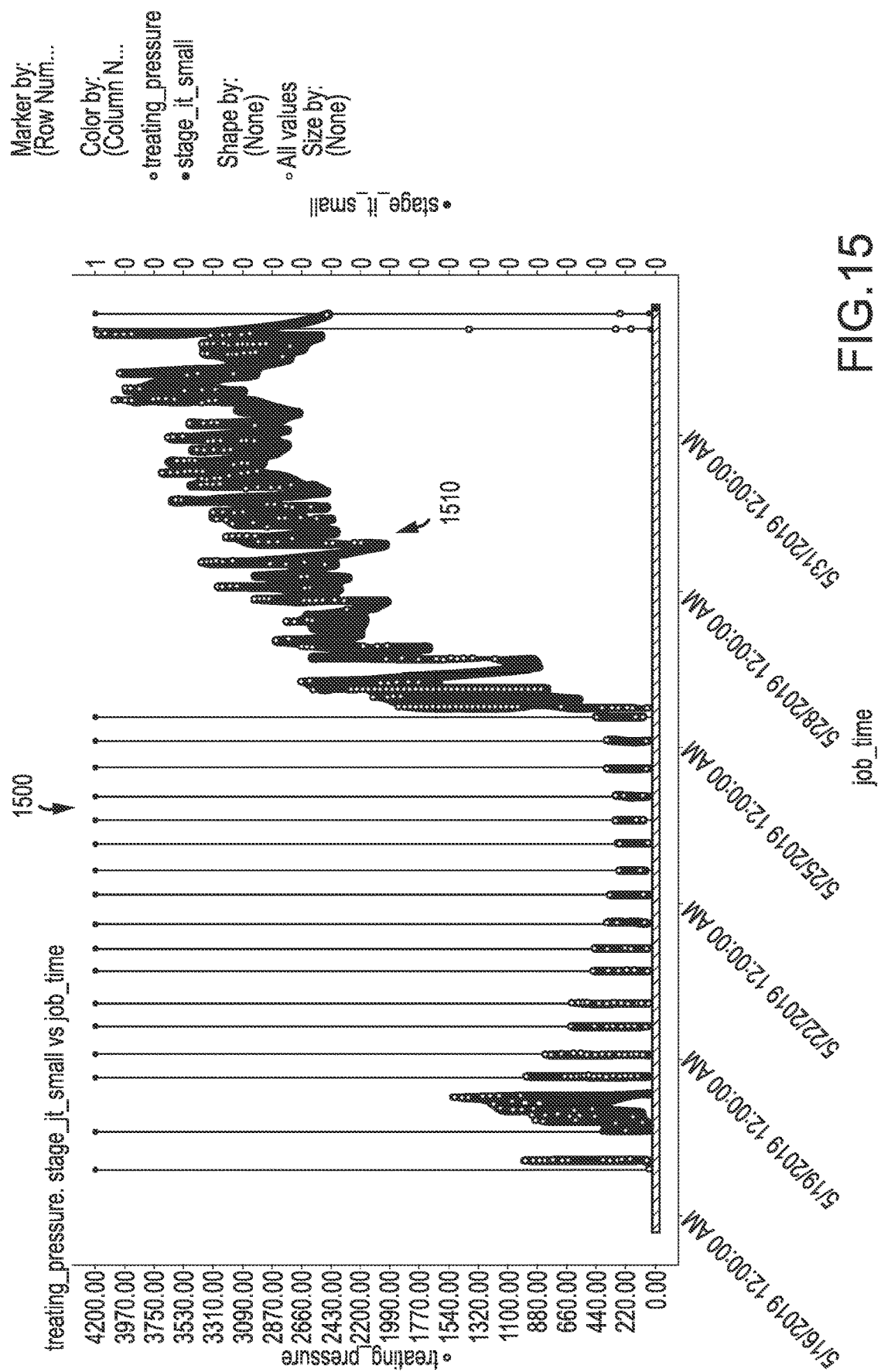
FIG. 15 is a diagram illustrating offset pressure responses for lower order pressure changes, according to one embodiment of the present disclosure.

This TP channel filter eliminates flags that are close to each other and can also be easily optimized. Finally, all events detected within the first part are collected in a partial list (e.g., time_list) that are displayed as flags at each job time. FIG. 15 below shows flagging 1500 of the lower TP that start from zero. Further, it can be seen that higher offset pressure responses 1510, initiating substantially above zero, to the right of the flagged responses are not yet flagged.

The second part (e.g., TP greater than 350 PSI) further filters the original data frame and generates additional channels. A median filter approximately two minutes wide is applied to the offset pressure (e.g., tp_median_filter) and its second derivative channels (e.g., TP" (tp_2nd_median_ filter)) to smooth the data and eliminate sensor noise. The system then creates a new data frame filtering out all zero (or close to zero) or positive values from the smoothed second derivative channels (e.g., values_close_to_zero). Thus, the system identifies points on a leading edge of a pressure increase when the second derivative of the pressure (TP") is negative. These points are characterized as events. The system may then merge or otherwise associate events into a group or interval if they are less than the duration of a planned stage (active well) apart from each other (e.g., within 1 hour or 3600 seconds or some other range). If the gap between consecutive events is longer than a planned stage then the latest event marks the beginning of a new group.

In another example, the system may not execute the offset pressure identification in two parts. In the above example, the first part was directed primarily at identifying low magnitude events that may be masked or otherwise difficult for the system to discriminate from noise. In an alternative, the system may apply a shorter duration median filter, e.g., 5 seconds wide, to the offset pressure channel and the second derivative channel. The system then generates a higher order channel retaining negative values of the filtered TP'" channel—where the negative values are indicated of a pressure change in the offset pressure. As with above, the system may isolated events into groups correlated with fracturing of an active stage in an active well.

Figure 16:
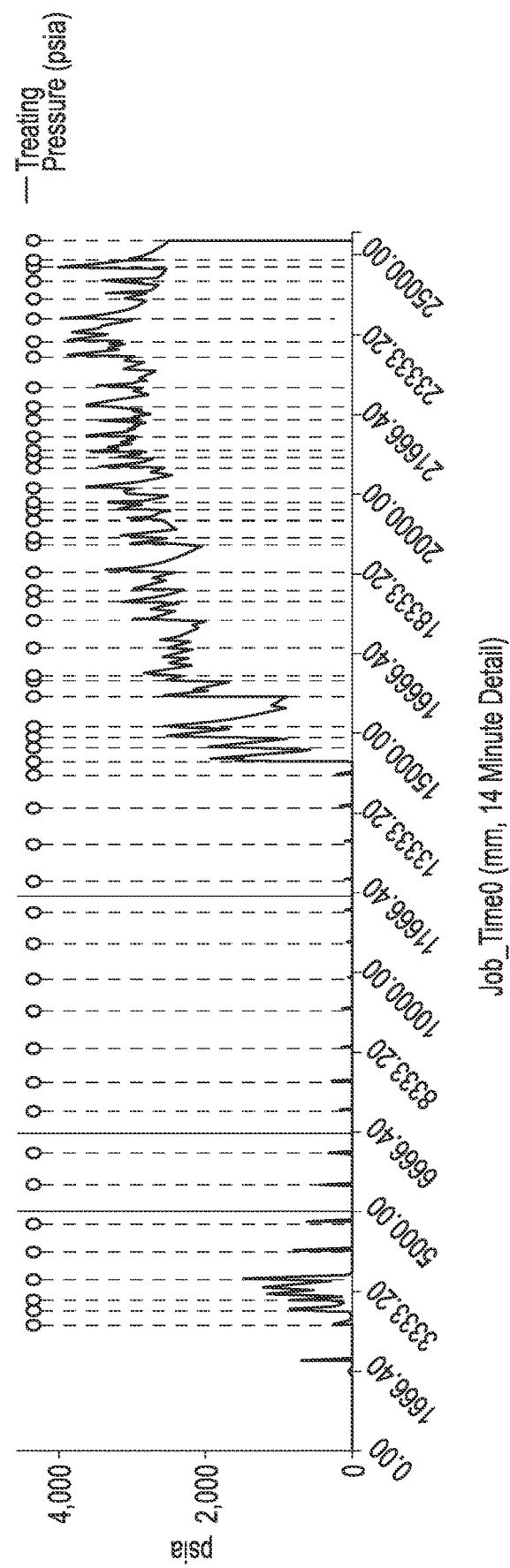
FIG. 16 is a diagram illustrating offset pressure responses in both lower order and higher order pressure changes due to fracture interaction, according to one embodiment of the present disclosure, with the location and degree of fracture interactions able to be used to perform various possible well defense operations to mitigate the effects of, reduce or elimate the effect of fracture interactions on the active well and/or legacy well.

Once events are located and grouped, the system may select a pressure response flag in a variety of ways. In one example, the system sets the time of the first member in a group as the time of the pressure response. In another example, the system sets the time of the lowest offset pressure as the time of the pressure response. In another example, the system may run a refinement function by generating a new data frame with an initial index located approximately 50 values before the initially selected job time from the prepared partial list of events and a final index based on a selected job time value index. The system selects the minimum value of offset pressure from the new data frame, and a corresponding job time value is selected as a refined job time. FIG. 16 below shows the offset pressure response on an entire offset well across pressure responses at or near zero as well as higher degree pressure responses.

The system may further generate a magnitude of the offset pressure response by calculating the difference between the pressure at the offset pressure time and the maximum offset pressure in a group. In another example, whether or not grouping is used, the system identifies the time at which the second derivative channel of offset pressure is zero following the time of the offset pressure (end boundary). The system obtains the offset pressure for the end boundary time, and determines the magnitude of the fracture driven interaction as the difference between the pressure at the end boundary and the pressure at the start boundary.

Figure 17:
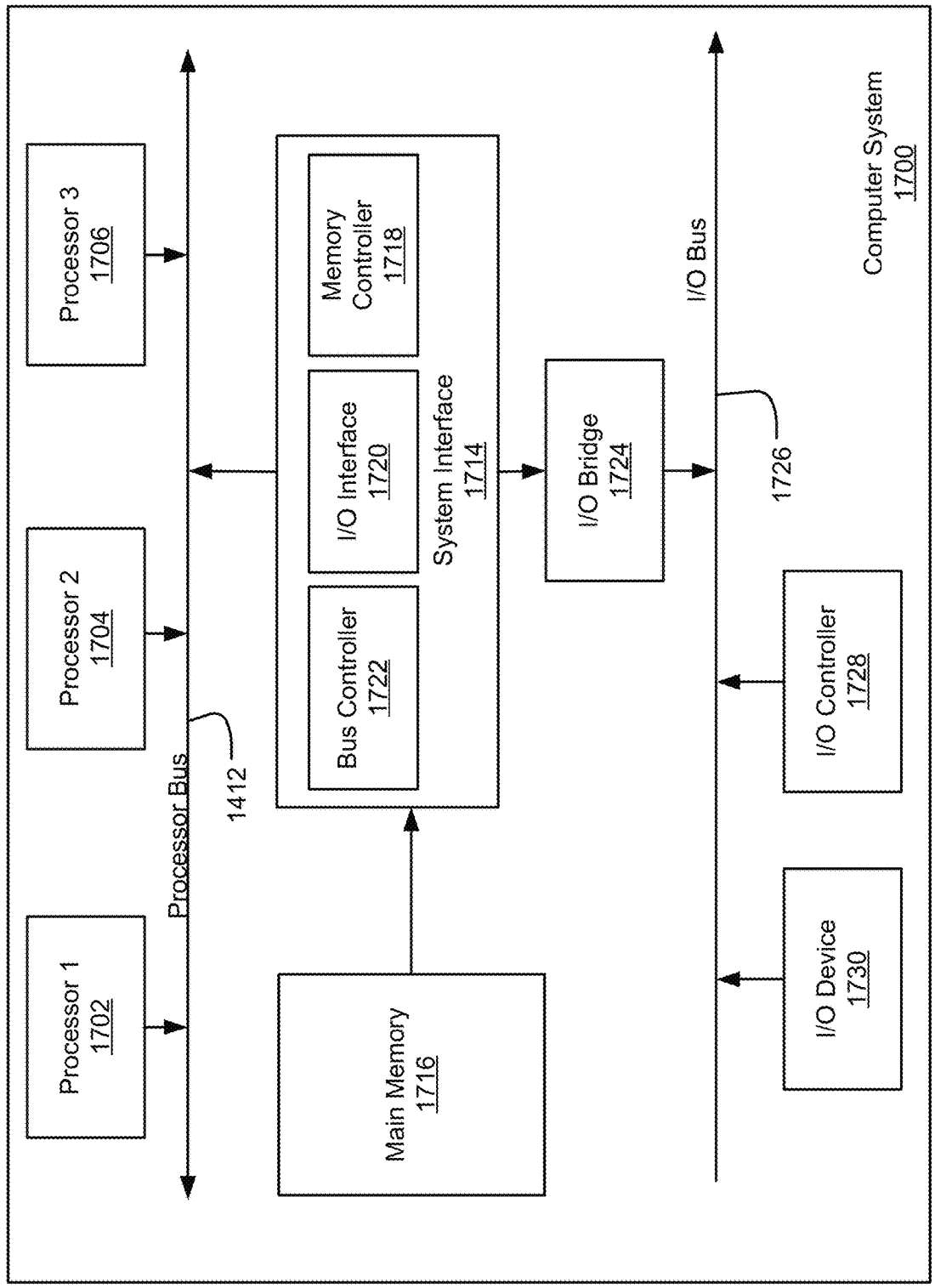
FIG. 17 is a diagram depicting one example of a processing system that may access data, process the data, and produce various possible outputs of the same, according to one embodiment of the present disclosure.

FIG. 17 is a block diagram illustrating an example of a computing device or computer system 1700 which may be used in implementing the embodiments of the processing system disclosed above. The computer system (system) includes one or more processors 1702-1706. Processors 1702-1706 may include one or more internal levels of cache (not shown) and a bus controller or bus interface unit to direct interaction with the processor bus 1712. Processor bus 1412, also known as the host bus or the front side bus, may be used to couple the processors 1702-1706 with the system interface 1714. System interface 1714 may be connected to the processor bus 1712 to interface other components of the system 1700 with the processor bus 1712. For example, system interface 1714 may include a memory controller 1718 for interfacing a main memory 1716 with the processor bus 1712. The main memory 1716 typically includes one or more memory cards and a control circuit (not shown). System interface 1714 may also include an input/output (I/O) interface 1720 to interface one or more I/O bridges or I/O devices with the processor bus 1712. One or more I/O controllers and/or I/O devices may be connected with the I/O bus 1726, such as I/O controller 1728 and I/O device 1730, as illustrated.

I/O device 1730 may also include an input device (not shown), such as an alphanumeric input device, including alphanumeric and other keys for communicating information and/or command selections to the processors 1702-1706. Another type of user input device includes cursor control, such as a mouse, a trackball, or cursor direction keys for communicating direction information and command selections to the processors 1402-1406 and for controlling cursor movement on the display device.

System 1700 may include a dynamic storage device, referred to as main memory 1416, or a random access memory (RAM) or other computer-readable devices coupled to the processor bus 1412 for storing information and instructions to be executed by the processors 1402-1406. Main memory 1416 also may be used for storing temporary variables or other intermediate information during execution of instructions by the processors 1702-1706. System 1400 may include a read only memory (ROM) and/or other static storage device coupled to the processor bus 1712 for storing static information and instructions for the processors 1702-1706. The system set forth in FIG. 17 is but one possible example of a computer system that may employ or be configured in accordance with aspects of the present disclosure.

According to one embodiment, the above techniques may be performed by computer system 1700 in response to processor 1704 executing one or more sequences of one or more instructions contained in main memory 1716. These instructions may be read into main memory 1416 from another machine-readable medium, such as a storage device. Execution of the sequences of instructions contained in main memory 1416 may cause processors 1702-1706 to perform the process operations described herein. In alternative embodiments, circuitry may be used in place of or in combination with the software instructions. Thus, embodiments of the present disclosure may include both hardware and computer executable instruction components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1416. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Aspects of the present disclosure involve automatically identifying various events in drilling and completion data streams. Events may be related to breakdown pressure, diverter, proppant steps, offset pressure (monitoring well pressure), and abnormal pressure changes among others. Additional aspects involve identifying a possible cause, or correlation, and effect within a well or between wells while drilling or completing a well. In one example, time series data from a first, active well, being completed, and time series data from a second, legacy or offset monitoring well, are analyzed to determine what an event, or attributes associated with the event, in the active well causes or is correlated with an effect, e.g., pressure change, in the monitoring well. As noted above, various aspects of the disclosure involve automatically identifying pressure changes, and particularly increases, in pressure in the monitoring well, which may be from FDI or otherwise from a fracture arriving at or intersecting the monitoring well and may suggest or necessitate a change to some parameter associated with completing an active well. In one example, the system correlates an event or events, such as identification of a diverter flag and/or or proppant steps, automatically identified in the active well with the system's identification of a pressure change in the monitoring well.

For purposes of illustration, a process of identifying an event in an active well and correlating that event with a pressure change in a monitoring well is described. However, aspects of the present disclosure may involve correlating events with other events within a well, correlating events between active wells, and may involve correlating any possible combination of events. Moreover, from a cause an effect perspective, correlated events may have a direct cause and effect relationship, or other attributes associated with an event may be a cause, and/or other attributes may be indicative of a cause. Moreover, correlation between events may be indicative of another event, such as surface operations.

Figure 18:
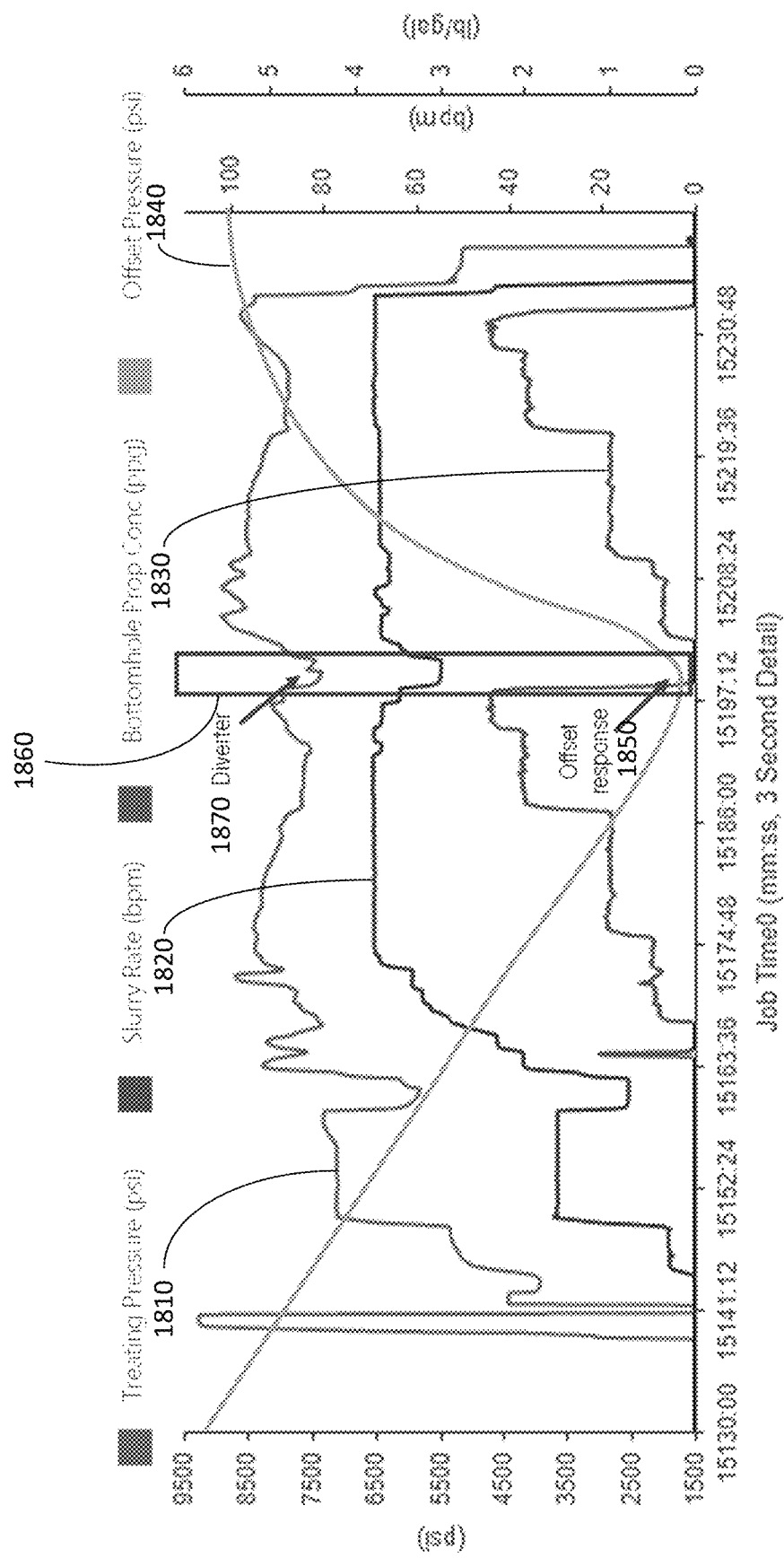
FIG. 18 is a diagram illustrating data streams from an active well and an offset well, with various events identified in the active well and offset well data according to various embodiments described herein, and from which the system may correlate various events and generate actions based thereon.
Figure 19:
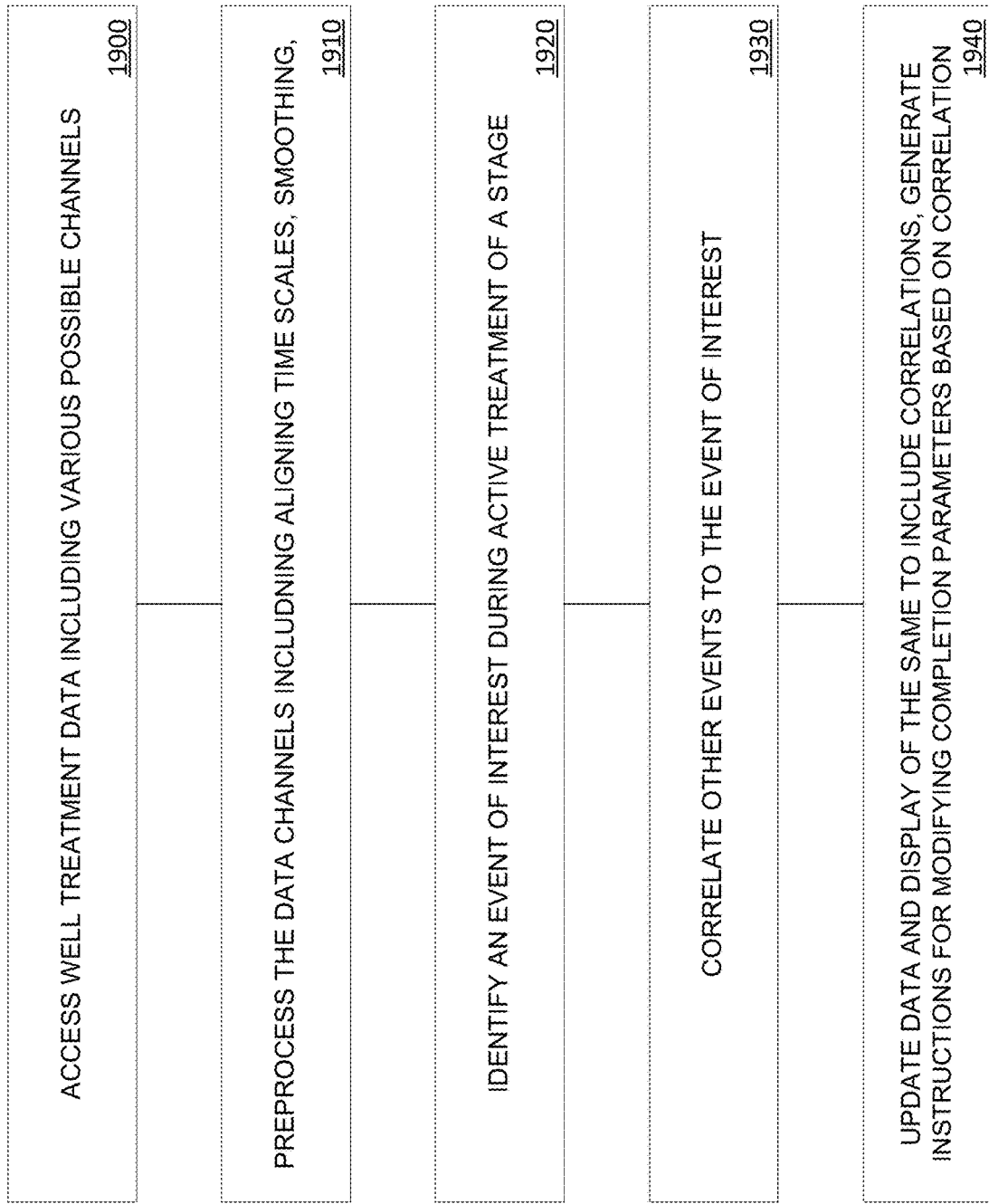
FIG. 19 is a flowchart illustrating one method of processing and acting on well treatment data according to one embodiment of the present application.

FIG. 18 illustrates a graph of time series data for an active well and a monitoring well. Within the graph, various events, identified by the system, in accordance with the present disclosure, as well as other events, are shown. FIG. 19 illustrates a method in accordance with the present disclosure. To begin, as with other process discussed herein, the system 114 accesses well treatment data (operation 1900). The system may then preprocesses the data (operation 1910). In one example, the system aligns the time scales between the two sets of time series data, unless the scales are already aligned. In one specific example, the data may be in a job time format or converted to the same for alignment.

For the active well, the time series data includes treating pressure 1810, slurry rate 1820, and bottomhole proppant concentration 1830 channels. For the monitoring well, the time series data includes pressure 1840 within the monitoring well, referred to as offset pressure and described above. The system may identify various events within the data channels (operation 1920). As can be seen, for the active well, various events are identified including stage start and stage end, a start of one or more proppant steps, an end of the one or more proppant steps. In an example, the system automatically identifies the start (event) and end (event) of actively hydraulically fracturing a stage. In an example, various events may be automatically identified pursuant to the techniques described in U.S. application Ser. No. 16/951,946 titled "Methods and Systems for Processing Time-Series Data Using Higher Order Channels," filed on Nov. 18, 2020, which is hereby incorporated by reference herein. For the monitoring well, the system assesses the data, and automatically identifies a point 1850 at which the pressure in the monitoring well begins to rise, identified as offset pressure, in the data.

The system then proceeds to correlate events (operation 1930). In this case, the system correlates events between the active well and the monitoring well. As noted above, when analyzing data between two different wells to determine how events may correlate, the system aligns the time scales between the data sets. To correlate events, the system may apply a time window 1860 around some event of interest. The time window may be to both sides of the event time, e.g., time before and after an event, or may be to one side or the other (e.g., time before or time after an event). The time window to either side may be of any range, e.g., 5 seconds, 5 minutes, 50 minutes. For time thresholds before and after, the time thresholds need not be symmetrical. Thus, the time threshold before the event may be less, the same or more than the time threshold after the event. Moreover, while the data is aligned by time, in one example, the thresholds need not be time-based or may be time-based along with some other basis. For example, rather than a time threshold, the system may apply a threshold of treating pressure (e.g., within some range of treating pressure values), slurry rate (e.g. within some range of slurry rate values), and any other values present in the time series data. Moreover, such non-time based information may be used for filtering purposes to reduce the area of analysis in the data.

In the present example, the system applies a time threshold to the diverter flag (event) 1870. More particularly, as discussed above, the system is able to identify a time at which diverter begins to cause a pressure increase in the active well. The system applies a time threshold to the time at which the diverter is flagged by the system. The system then identifies any other flag that may be within the time threshold. In this example, it can be seen that the offset pressure flag 1850, from the monitoring well, occurs immediately following the diverter flag. Depending on the time threshold or thresholds applied to the diverter event, the offset pressure flag (event) will be identified by the applied threshold. Depending on the arrangement of the system, the identification of a pressure response in an offset well correlated with diverter in an active well may be considered indicative of FDI, and the system may alert to such correlations by setting an FDI flag (not shown) in the GUI or otherwise in the displayed data (operation 1940). The system may further collect meta-data from the drilling data for the active well and/or the offset well associated with the diverter flag, the FID flag, and/or the offset pressure flag. For example, the system, due to the alignment of time scales between data streams, may identify times between events such as when the diverter flag occurs and how long until the offset pressure begins to rise. In one example, through the GUI, clicking the FDI flag may display information for various data fields of the active well at the time of the FDI flag.

While some fracture interactions may enhance production, in many instances fracture interactions are undesirable and to be avoided. Accordingly, by automated identification of FDI, it is possible to alter parameters of the stage being completed (operation 1940) and/or adjust parameters related to subsequent wells being completed that would slow the time to FDI and/or mitigate its occurrence.

In the case of diverter, besides automatically identifying when diverter is correlated with a pressure change, the system also captures other attributes, which may be considered meta-data, at the time when the diverter flag is correlated with an offset pressure increase. The attributes may be relevant to the diverter, e.g., a type, an amount, etc., and may be related to other attributes of the time series data such as treating pressure, slurry rate, bottomhole proppant concentration (and type) and other data. Moreover, the system may also collect or compute derived data, e.g., the rate of pressure change caused by the diverter in the active well, and the rate of change in offset pressure.

The system may apply further correlations to the data. For example, in the case of offset pressure, alone or in combination with diverter, the system may correlate proppant steps with offset pressure. For example, the system may apply a threshold to a start of the proppant or some other attribute of proppant (e.g., concentration amount) to determine whether there is any correlation between offset pressure and bottomhole proppant concentration. Because the system may automatically detect various discrete events in the data, the system may also correlate events without human intervention. Moreover, the system may isolate data based on some other attribute. For example, like identifying diverter, the system may limit its analysis of offset pressure to the same filtered set of data falling between proppant steps.

The system may further collect data from many wells, and apply various thresholds against various events to determine if there are any consistent correlations. For example, the system may collect data between active and offset wells, add additional information, such as a distance between the active well and offset well, formation characteristics, treating pressure, and other information, and determine a relationship between pumping diverter, treating pressure, and the like and whether there an pressure response in the offset well.

Correlation and action may also be directed to events occurring within a well, and particularly based on detected events occurring when hydraulically fracturing a particular stage of the well. In one example, the system may automatically identify abnormal or otherwise unexpected pressure behavior, and correlate that behavior to an event or events from which the system may further determine the cause, or likely cause of the unexpected pressure behavior. In some instances, the system may further generate a responsive action.

Returning again to the method of FIG. 19, the system may process data to correlate abnormal pressure increases within a stage being actively completed with other events, and generate actions based thereon. To begin, the system 114, e.g., a controller receives real-time data collected in the field or otherwise accesses the same (operation 1900). The system may also access the data from storage. In one example, received data is recorded at one-second intervals and saved in comma-separated (CSV) files. Further, the high resolution treatment data may be collected from the field at a sampling frequency of 1 Hz. The raw one-second data includes multiple channels including, but not limited to, treating pressure and slurry rate. The data may also include clean volume and proppant concentration (surface and/or bottomhole) channels. As discussed further below, the data channels may also include relevant chemical channels (e.g., friction reducer concentration) useful for providing context and identifying expected operational related pressure changes.

The system 114 preprocesses the data (operation 1910). For example, the system may filter (smooth) the slurry rate and treating pressure channels. The smoothing operation simplifies the channels for further processing, allowing the system to more efficiently execute subsequent operations, which may help lead to results more quickly in a way particularly important for real-time processing. A centered median smoother helps preserve the location of any sharp changes in pressure behavior making identification of pressure increases, discussed below, more accurate and occur with more efficiently (with less processing). In one example, system 114 applies a short window centered median smoother or other median filter to the slurry rate and treating pressure channels. Alternatively, the system may separately smooth the slurry rate channel. Raw channel data can be quite noisy, and its qualitative characteristics can vary significantly between different operations. In one specific example to address these issues, the system fits a linear smoothing spline to the signal. The advantage of using a smoothing spline is that the frequency of knots (breakpoints) can be specified as a function of the noise (residuals) in the signal and be learned from the training data. This allows the system to adapt to sensor noise behavior changes as operations change (both within a stage and between different jobs). Moreover, by using a linear spline, the subsequent derivatives will be constant for intervals with changes in slope occurring only at the knots. This, in turn, simplifies learning rules for classifying rate behavior from the data, which makes identification of pressure changes more accurate and thus analysis more accurate. In one example, the downsampled and smoothed signals (e.g., slurry rate and treating pressure) are only used to help identify the events of interest. The various preprocessing operations may also be deployed in the above-described method involving an active well and offset well.

The system may also conduct other preprocessing functions against the data channels. For example, the system may normalize the data by parsing metadata and headers, standardize the channels with consistent names and units, which may involve converting to a unit recognized by the system. The system may fill in any missing values using any one of many standard data interpolation algorithms such as by filling in missing data values with the last known value. The system may also set any negative values of the treatment channels to zero. For some data, the variability and the noise present in the 1 Hz data can complicate the processing of subsequent operations and make identification of important short duration pressure changes difficult to identify. In one example, the system downsamples the signals to a lower frequency than 1 Hz. The downsampling frequency is a parameter that can be tuned and identified by cross-validation. An additional benefit of downsampling the data is that the time-series data is smaller. Any subsequent calculations using the downsampled data will be more efficient both in terms of size and speed of computation, which can be particularly useful in real-time applications but nonetheless optimizes use of computing resources.

The system then moves to identifying an event of interest (operation 1920). In the present example, the system identifies abnormal pressure increases, which involves a sequence of operations to identify pressure changes and discriminate between normal pressure changes and abnormal pressure changes. In this regard, the system may generate new channels related to the slope of the smoothed treating pressure and slurry rate channels. In one example, the system 114 determines a first derivative of the smoothed slurry rate channel and a first derivative of the smoothed treating pressure channel, and generates channels for each of the same. Alternatively, the system determines a moving maximum value increase (decrease) in a moving window of each of the smoothed slurry rate and smoothed treating pressure channels. By using a centered moving window of one minute, the system identifies the maximum increase (decrease) in the respective channels in any given one-minute interval, which can form the basis of two distinct channels or otherwise mark associated events in the existing channels.

The system uses these rate changes to classify segments of time as candidate intervals for abnormal pressure changes. In one example, the system compares the identified treating pressure changes and slurry rate changes to thresholds. The thresholds are used to identify increases or decreases in treating pressure when the slurry rate is relatively constant (slurry rate is not changing). As a general notion, it is expected that treating pressure does not change while slurry rate is constant. The threshold parameters can be calibrated from the data and should be chosen to favor false positives over false negatives; that is, the system will err on the side of overreporting intervals. In one example, the rate of change of pressure threshold may be 1000 psi/min and the rate of change threshold of the slurry rate may be 0 bbl/min or some value near zero to account for modest noise in the system. False positives can be filtered out using business/operational rules appropriate for the particular formation or pump schedule.

After the intervals have been identified, various statistics for each interval can be calculated: the duration of the interval, the mean (or median) slurry rate, treating pressure and proppant concentrations, as well as the rate of change of pressure over the interval. Rules for excluding certain intervals can easily be included. For example, pressure increases that occur before a certain rate or volume has been achieved may be filtered out. Additional calculated channels that identify regions of decreasing proppant concentration and friction reducer can be used to remove intervals that coincide with expected pressure increases (normal pressure increases) due to operational changes.

The system may further filter intervals by excluding intervals not associated with active pumping operations. In one example, the system automatically identifies the start and end of active pumping of stage and only includes intervals within the active stage (between the automatically identified start and end). In one example, the system automatically identifies the start and end by way of the technique described in U.S. patent application Ser. No. 16/931,288 titled "Offline and Real-Time Start and End Times Detection," which is hereby incorporated by reference herein.

In preparation for correlating the abnormal pressure changes with other events, the system may also account for standard pumping operations that occur within an active stage. For example, the system may access various possible channels to identify operations including acid pad, sweeps, flushes, proppant steps and target rate. In one example, such events may be automatically identified pursuant to the techniques described in U.S. application Ser. No. 16/951, 946 titled "Methods and Systems for Processing Time-Series Data Using Higher Order Channels," filed on Nov. 18, 2020, which is hereby incorporated by reference herein. In the case of proppant steps, the system may also access and use statistics for each step (e.g., mean slurry rate, treating pressure, and proppant concentration) as well as the maximum treating pressure change during the step.

The system may generate any number of possible flags or otherwise identify different events within the active stage. Such events may be identified in parallel with the identification of abnormal pressure behaviours, as well as prior to or subsequent recognizing that some events may be used to determine whether pressure changes are normal or abnormal. The system generates the events and sorts the events chronologically if necessary. The system them applies a window around each identified APB to correlate various possible events with the APB (operation 1930).

Figure 20:
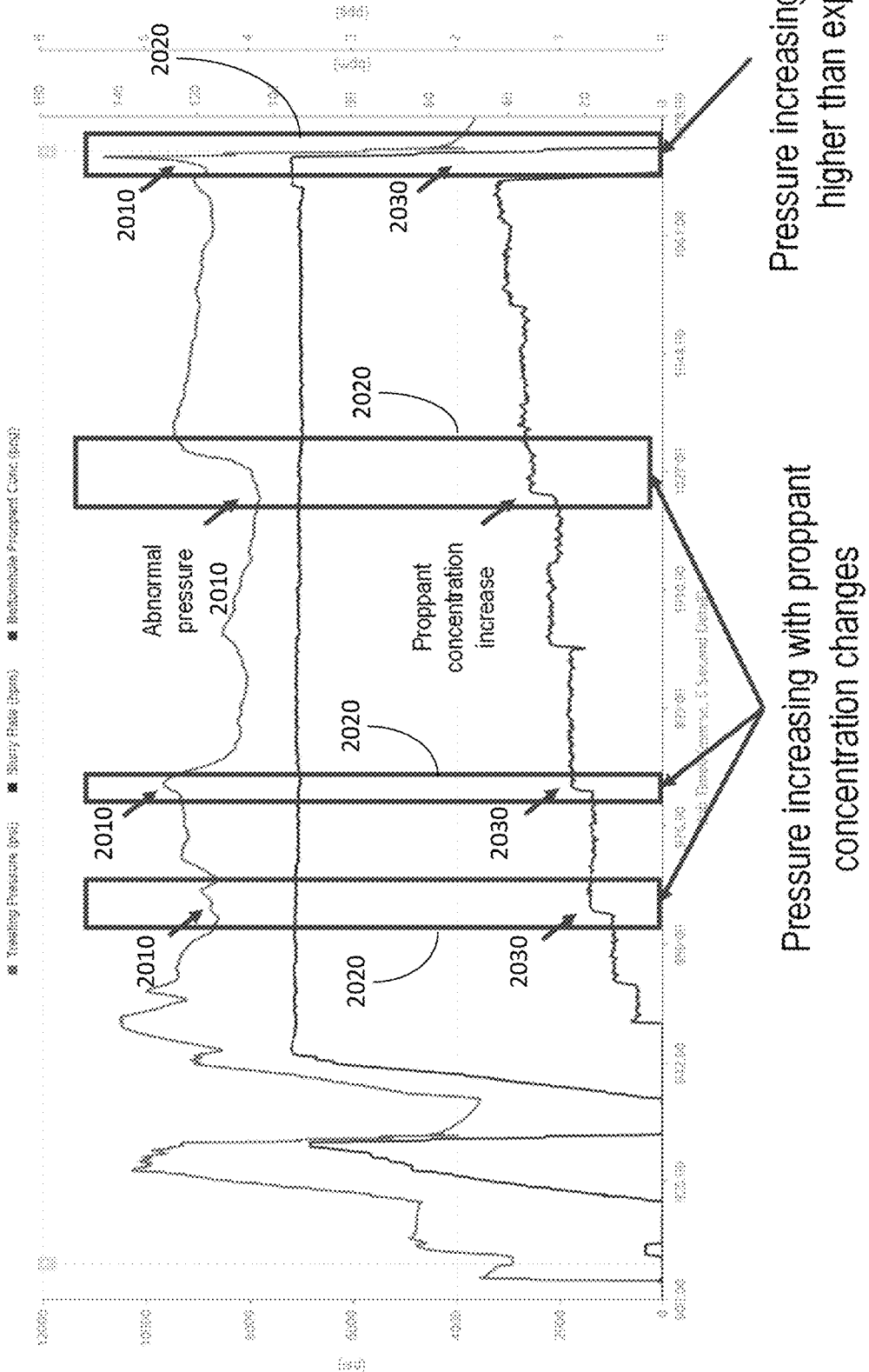
FIG. 20 is a diagram illustrating data streams from an active well, with various events identified in the active well according to various embodiments described herein, and from which the system may correlate event and generate actions based thereon.

Generally speaking, an event falling within a window is correlated to the APB. In one example, the system identifies the closest flags to each APB 2010 by examining the rows immediately prior to and following each APB, an example of which is illustrated in FIG. 20. In the example of FIG. 20, there are time windows 2020 around each APB, that identify other events 2030 within the windows. The time difference between events, within a window, may then be calculated. The inter-flag duration can be used to filter events associated with each APB within a threshold. Note that the system may also consider events following, in time, an APB as such events have the potential of being associated with an APB. For example, a flag may have been placed in the middle of a process transition (e.g., a slower ramp up in proppant concentration) or because of time synchronization issues that may be associated with calculated fields such as BHPC.

The system may further classify abnormal treating pressure increases as either formation or operations related. Operations related abnormal pressures can be attributed to equipment failures or chemical changes made on location.

Formation related abnormal pressures can be attributed to near-wellbore effects. Identifying, analyzing, and cataloging pressure increases for a job as it is being pumped provides several advantages. The statistics and analyses of APBs from recent stages can be used to guide the adjustments to the pump schedule of the current stage to alleviate pressure increases. For example, if an APB in the current stage being treated looks similar to an APB observed in a previous stage, similar mitigation measures can be applied if the measures were effective earlier. The notion of effective here means both operationally effective and cost-effective. More concretely, in this hypothetical scenario, if a small increase in friction reducer (~0.25 gpt) was enough to alleviate the earlier APB, then the crew might want to start with the same small amount rather than default to something larger.

In terms of correlations, several formation associated pressure increases are correlated with changes in proppant concentrations (events). For example, abnormal pressure behavior correlated with a significant change in the bottom-hole proppant concentration may indicate that the formation is hard to fracture and that the fracture width is not wide enough to admit all the volume of proppant being pumped. It is common for there to be a pronounced impact on treating pressures if the perforation is located outside the target zone. In another example, APBs correlated with proppant concentration lying in the range of 1.5-2.0 PPA and a step change (increase) in the concentration may provide an early signal that there may be problems in the stage, which may be used by the system to generate an alert.

The system may further enhance use of various chemicals including friction reducers or failure of related systems. For example, automatically identifying pressure increases associated with changes in the concentration of friction reducer may provide information for altering friction reducer. In another example, an APB correlated with a sharp change in friction reducer may be indicative of a chemical pump's failure that stopped the flow of friction reducer to the line. In addition to using the surface chemical reading channels, the system may used BHPC to identify when the fluid change arrived at the perforations. Understanding the expected effects of fluids or chemical changes can help with optimizing chemical loadings and fluid design while maintaining a level of caution to prevent screen outs. Historical data that has been analyzed can be used to identify regions where it is possible to run lower FR concentrations. In many cases, the FR concentration is changed throughout the treatment as these safe regions are encountered. By incorporating the signatures of these safe regions (indicated by certain pressures, rates, and proppant concentrations) into a workflow, manual or automated, it is possible to target and flag sub-optimal regions of the fracturing job where FR concentration could be lowered carefully.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

For clarity of explanation, in some instances the various embodiments may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain operation or group of operations. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various embodiments of the disclosure are discussed in detail above. While specific implementations are discussed, it should be understood that this is done for illustration purposes only. A person skilled in the relevant art will recognize that other components and configurations may be used without parting from the spirit and scope of the disclosure. Similarly, various combinations of various aspects of the various embodiments define different embodiments. Thus, the above description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure are set forth in the description, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the above description and appended claims, or can be learned by the practice of the principles set forth herein.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A non-transitory computer readable medium comprising computer executable instructions that, when executed by a processor, perform the following:
   access well data comprising a series of well data parameters of a first well including at least one of a series of treating pressure values, a series of slurry rate values or a series of proppant concentration values, the series of well data parameters of the first well corresponding to a time when the first well is being hydraulically fractured;
   access well data comprising a series of pressure values for a second well offset from the first well, the series of pressure values corresponding to the time when the first well is being hydraulically fractured;
   identify a time for an event from the series of well data parameters;
   identify an offset pressure increase in the series of pressure values for the second well; and
   generate an indication of fracture driven interaction between the first well and the second well when the offset pressure increase is within a threshold of the event.

2. The non-transitory computer readable medium of claim 1 further comprising computer executable instructions that, when executed by a processor, perform the following:
   preprocess the series of well data parameters of the first well to align the time when the first well is being hydraulically fractured with the series of pressure values of the second well.

3. The non-transitory computer readable medium of claim 1 wherein the threshold is a time window.

4. The non-transitory computer readable medium of claim 1 wherein the indication of fracture driven interaction is a flag set in a graphical user interface.

5. The non-transitory computer readable medium of claim 1 further comprising computer executable instructions that, when executed by the processor, perform the following:
   generate at least one of an indication of a rate of change of treating pressure in the first well associated with the fracture driven interaction or a rate of change of offset pressure in the second well associated with the fracture driven interaction.

6. The non-transitory computer readable medium of claim 1 further comprising computer executable instructions that, when executed by the processor, perform the following:
   generate at least one event based on at least one of the series of treating pressure values and the series of pressure values; and
   correlate the at least one event with the fracture driven interaction.

7. The non-transitory computer readable medium of claim 1 wherein the computer executable instructions that, when executed by the processor, perform the following:
   access a series of slurry rate values of the first well corresponding to a time when the first well is being hydraulically fractured;
   access a series of bottomhole proppant concentration values of the first well corresponding to a time when the first well is being hydraulically fractured; and
   generate the event from at least one of the series of treating pressure values, the series of slurry rate values or the bottomhole proppant concentration values.

* * * * *